(12) United States Patent
Erdogan et al.

(10) Patent No.: US 11,460,560 B2
(45) Date of Patent: Oct. 4, 2022

(54) PHOTON SENSOR APPARATUS

(71) Applicant: The University Court of the University of Edinburgh, Edinburgh (GB)

(72) Inventors: Ahmet Erdogan, Edinburgh (GB); Robert Henderson, Edinburgh (GB); Richard Walker, Edinburgh (GB)

(73) Assignee: THE UNIVERSITY COURT OF THE UNIVERSITY OF EDINBURGH, Edinburgh (GB)

( * ) Notice: Subject to any disclaimer, the term of this patent is extended or adjusted under 35 U.S.C. 154(b) by 424 days.

(21) Appl. No.: 16/474,000

(22) PCT Filed: Dec. 28, 2017

(86) PCT No.: PCT/GB2017/053900
§ 371 (c)(1),
(2) Date: Jun. 26, 2019

(87) PCT Pub. No.: WO2018/122560
PCT Pub. Date: Jul. 5, 2018

(65) Prior Publication Data
US 2020/0116838 A1 Apr. 16, 2020

(30) Foreign Application Priority Data
Dec. 30, 2016 (GB) ..................... 1622429

(51) Int. Cl.
*G01S 7/48* (2006.01)
*G01J 3/44* (2006.01)
(Continued)

(52) U.S. Cl.
CPC .............. *G01S 7/4866* (2013.01); *G01J 3/44* (2013.01); *G01S 7/4808* (2013.01); *G01S 7/4863* (2013.01); *G01S 17/10* (2013.01)

(58) Field of Classification Search
CPC .... G01S 7/4866; G01S 7/4808; G01S 7/4863; G01S 17/10; G01S 17/18; G01S 7/4816; G01S 7/487; G01S 7/4865; G01J 3/44
See application file for complete search history.

(56) References Cited

U.S. PATENT DOCUMENTS

| 8,150,636 B2* | 4/2012 | Labarbe | G01N 21/6408 702/22 |
| 9,831,283 B2* | 11/2017 | Shepard | H01L 31/1075 |

(Continued)

OTHER PUBLICATIONS

International Search Report and Written Opinion dated Jul. 5, 2018 in PCT Application PCT/GB2017/053900.
(Continued)

*Primary Examiner* — Seung C Sohn
(74) *Attorney, Agent, or Firm* — Snell & Wilmer L.L.P.

(57) ABSTRACT

A sensor apparatus for photon sensing comprises a plurality of pixel devices, each pixel device comprising: a plurality of photon detectors arranged to produce photon detection signals in response to photon detection events; a processing resource configured to process photon detection signals to produce photon detection event signals, wherein each photon detection event signal comprises time data representative of a photon detection time at which a respective photon detection event occurred; a pixel memory; a further processing resource configured to process the photon detection event signals to obtain detection data representative of photon detection events over a detection period; a communication resource for transmitting the detection data from the pixel device, wherein the processing of the photon detection event signals is such that storing and/or transmission of the detection data uses less storage capacity and/or communication capacity than would be used by storage and/or transmission of the photon detection event signals directly.

24 Claims, 14 Drawing Sheets

(51) Int. Cl.
  *G01S 17/10*  (2020.01)
  *G01S 7/4865* (2020.01)
  *G01S 7/4863* (2020.01)

(56) References Cited

U.S. PATENT DOCUMENTS

| | | | |
|---|---|---|---|
| 10,317,529 B2* | 6/2019 | Shu | H01L 31/107 |
| 10,416,293 B2* | 9/2019 | Buckley | G01S 7/4861 |
| 10,527,728 B2* | 1/2020 | Wang | G01S 7/4865 |
| 10,739,445 B2* | 8/2020 | Hollmann | G01S 17/10 |
| 2012/0162632 A1 | 6/2012 | Dutton | |
| 2012/0280131 A1 | 11/2012 | Spartiotis | |
| 2013/0300838 A1 | 11/2013 | Borowski | |
| 2014/0021356 A1 | 1/2014 | Zwanns et al. | |
| 2014/0217264 A1 | 8/2014 | Shepard | |
| 2016/0029886 A1 | 2/2016 | Shiba et al. | |
| 2016/0133668 A1 | 5/2016 | Rothberg | |

OTHER PUBLICATIONS

JPO; Ofice Action dated Oct. 5, 2021 in Application No. JP 2019-535786.
ISA; International Preliminary Report on Patentability dated Jul. 2, 2019 from PCT/GB2017/053900.
European Patent Office, European Office Action dated Dec. 17, 2021 in Application No. 17825598.0.
Dutton Neale A W et al.: "11.5 A time-correlated single-photon-counting sensor with 14GS/S histogramming time-to-digital converter",2015 IEEE International Solid-State Circuits Conference—(ISSCC) Digest of Technical Papers, IEEE, Feb. 22, 2015 (Feb. 22, 2015), pp. 1-3.

* cited by examiner

PHOTON SENSOR APPARATUS

CROSS-REFERENCE TO RELATED APPLICATIONS

This application is U.S. national phase filing under 35 U.S.C. § 371 of PCT/GB2017/053900 (the "900 application") filed on Dec. 28, 2017 and titled, "Photon Sensor Apparatus." The '900 application claims priority from the Great Britain Application No. 1622429.7 filed Dec. 30, 2016 and titled, "Photon Sensor Apparatus." Both of the aforementioned applications are incorporated herein by reference in their entirety for all purposes.

The present invention relates to a photon sensor apparatus, for example an apparatus suitable for asynchronous detection and measurement of sparse photonic events.

BACKGROUND

Charge-coupled devices (CCDs) and complementary metal-oxide semiconductors (CMOS) are two types of commonly used line sensor. Neither is capable of producing time-resolved outputs. Competing single photon avalanche diode (SPAD) array technology exists.

SPADs in various light detectors, including point, line and 2D imaging arrays are known. A basic single SPAD receiver produces an electronic output when struck by a single photon. These individual receivers are typically arranged in an array together with additional circuitry to form a pixel device, which may be referred to as a pixel for brevity. In turn, the pixel devices may be arranged in a linear chain to form a line sensor, or in 2-D arrays to form an imaging sensor. These sensors provide a unique combination of light sensing capabilities for use in high speed sensitive optical instrumentation, and allow time-resolved information to be obtained in relation to ultra-fast optical phenomena.

For time correlated single photon counting (TCSPC) histogramming, off-chip histogram memories are large. Known, solid-state SPAD sensors implement time to digital converters (TDCs) in pixel but transfer time-stamp data off-chip to perform TCSPC histogramming by using external memory resources, for example external solid-state memory or hard-drives. An input/output (I/O) data bottleneck may be reached as each photon detected by the SPAD requires data to be transferred off-chip.

Assuming a total of P pixels, a maximum I/O rate of R bits per second and L is a size of word (number of bits) generated per pixel, the maximum photon rate per pixel is limited to R/(L×P) Hz. As the number of pixels increases there is a corresponding decrease in the maximum rate of photons which can be transferred to an external memory. This rate may be significantly lower than both the rate that the SPADs can generate pulses (100 s of MHz) and the rate that the TDC can process those pulses (100 s of MHz). The I/O rate of a chip is normally limited by the number of pads, data rate of those pads and power consumption. Rates R in the range of Gb/s are typical of high resolution CMOS image sensors. This leads to maximum photon rates of around 1 MHz for pixel arrays of around 1000 pixels, two orders of magnitude below the available peak capacity dictated by those other factors. For imagers with 10-100 k pixels this situation is proportionately more constraining.

SUMMARY

In a first aspect of the invention there is provided a sensor apparatus for photon sensing, comprising: a plurality of pixel devices, each pixel device comprising: a plurality of photon detectors arranged to produce detection signals in response to photon detection events. The apparatus may comprise a processing resource, for example a processing resource dedicated to that pixel or shared with other pixels, configured to process the detection signals to produce photon detection event signals, wherein each photon detection event signal comprises time data representative of a detection time at which a respective photon detection event occurred. The apparatus may comprise a further processing resource configured to process the photon detection event signals to obtain detection data representative of photon detection events over a detection period. The apparatus may comprise a pixel memory. The apparatus may comprise a communication resource for transmitting the detection data from the pixel device. The processing of the photon detection event signals may be such that the storing and/or transmission of the detection data uses less storage capacity and/or communication capacity than would be used by storage and/or transmission of the photon detection event signals. The pixel memory may be configured to store the detection event signals and/or the detection data. In the case where the processing resource is a shared processing resource, for a plurality of the pixels there may be a single shared processing resource (e.g. a TDC) configured to process the detection signals to produce photon detection event signals.

Each photon detector may comprise a single photon avalanche diode (SPAD).

The processing of the photon detection event signals may comprise a histogramming process and/or the detection data may comprise histogram data.

The processing of the detection signals produced by the photon detectors may comprise a time to digital conversion process.

The detection data may represent a distribution of photons detected at the sensor apparatus as a function of time.

The processing of the photon detection event signals may comprise assigning the photon detection event signals between a plurality of time bins. The processing of the photon detection event signals may comprise obtaining count data representing a respective count value for each time bin of the plurality of time bins. In response to a detection event, collected and stored photon detection data may represent a time distribution of photons arriving at the sensor apparatus.

Each time bin may have a width representing a time interval and the further processing resource may be configured to select or vary the width of at least one of the time bins.

The further processing resource may be configured to select or vary the width of at least one of the time bins automatically or in response to user input, and/or based on at least one configuration parameter.

The further processing resource may be configured to select the detection period in dependence on feature of interest for example a measured or expected position of a peak in a distribution of photon detection events.

The photon detection event signals may be obtained during the detection period and the processing of the photon detection event signals may comprise selecting a portion of the detection period and excluding photon detection event signals from outside the selected portion of the detection period, for example when processing the detection signals to obtain the detection data.

The processing resource may be configured to assign the detection event signals for the selected portion of the detection period across the time bins.

The further processing resource may be configured to modify and/or to select a part of the time data, for example in order to select or vary the width of the time bins and/or in order to select a portion of the detection period.

Each item of time data may comprise a series of bits and the modifying of the time data may comprise, for at least some of the items of timestamp data, excluding at least some bits of the series of bits.

Each pixel device may be configured to reset the further processing resource and write signals from the further processing resource automatically.

The selecting of at least part of the time data may comprise, for at least some of the items of time data, selecting some of the bits of the series of bits.

The apparatus may further comprise a delay generator for modifying a clock signal provided to the initial processing resource, thereby to delay collection of photon detection data and/or to shift the detection period.

The pixel memory may comprise one or more counters. The pixel memory may comprise tri-stated MUX components. Counters may be used to count the number of photon events detected for each bin. At the end of an exposure time, counter contents may be stored into histogram memory (in preparation of readout) and counters may be reset for the next exposure cycle.

The pixel memory may have a size of at least 5 bytes or 10 bytes and less than 1 kilobytes. Preferably, the pixel memory is less than 50 bytes, for example 44 bytes. The pixel memory size may be selected in dependence on number of histogram bins and/or number of bits per bin, or vice versa. For example, there may be 32 bins and 11-bits per bin, hence a total pixel histogram memory of 44 bytes.

For each of the pixel devices, the communication resource of the pixel device may be configured to transmit the detection data from the pixel device to an additional processing resource remote from the pixel device and/or a further memory remote from the pixel device.

The additional processing resource and/or the further memory may be configured to process and/or store detection data from each of the plurality of pixel devices.

The sensor apparatus may be provided on a chip or circuit board and the additional processing resource and/or further memory may be outside the chip or circuit board, for example remote from the chip or circuit board.

For each of the plurality of pixel devices, the initial and/or further processing resources and/or the memory of the pixel device may be located adjacent to or at least partially beneath the plurality of photon detectors.

The plurality of pixel devices may be arranged in an array, and for at least some of the pixel devices the further and/or initial processing resources and/or the memory of the pixel device may be located between the photon detectors of the pixel device and the photon detectors of an adjacent pixel device.

The photon detection events may occur in response to application of the laser radiation to a subject. The apparatus may be configured such that operation of the photon sensors and/or the processing of the photon detection event signals and/or the detection period is synchronised with operation of a laser that applies the laser radiation, for example pulsed laser radiation.

The apparatus may be configured for use in, for example, a Lidar system, a Time-of-flight system, a fluorescent spectroscopy system or a Raman spectroscopy system.

In a further aspect, which may be provided independently, there is provided a sensing method, comprising: obtaining photon detection event signals at a pixel device in response to photon detection events, wherein each photon detection event signal comprises time data representative of a detection time at which the photon detection event occurred; processing at the pixel device the photon detection event signals to obtain detection data representative of photon detection events over a detection period; transmitting the detection data from the pixel device, wherein the processing is such that the storing and/or transmission of the detection data uses less storage capacity and/or communication capacity than would be used by storage and/or transmission of the photon detection event signals.

In another aspect there is provided a sensing system comprising a laser configured to apply laser radiation to a subject, and a sensor apparatus as claimed or described herein that is configured to sense photons emitted by the subject in response to the laser radiation.

Features in one aspect may be provided as features in any other aspect, in any appropriate combination. For example, method features may be provided as apparatus features and vice versa.

BRIEF DESCRIPTION OF THE DRAWINGS

Various aspects of the invention will now be described by way of example only, and with reference to the accompanying drawings, of which.

DETAILED DESCRIPTION OF THE DRAWINGS

Figure 1:
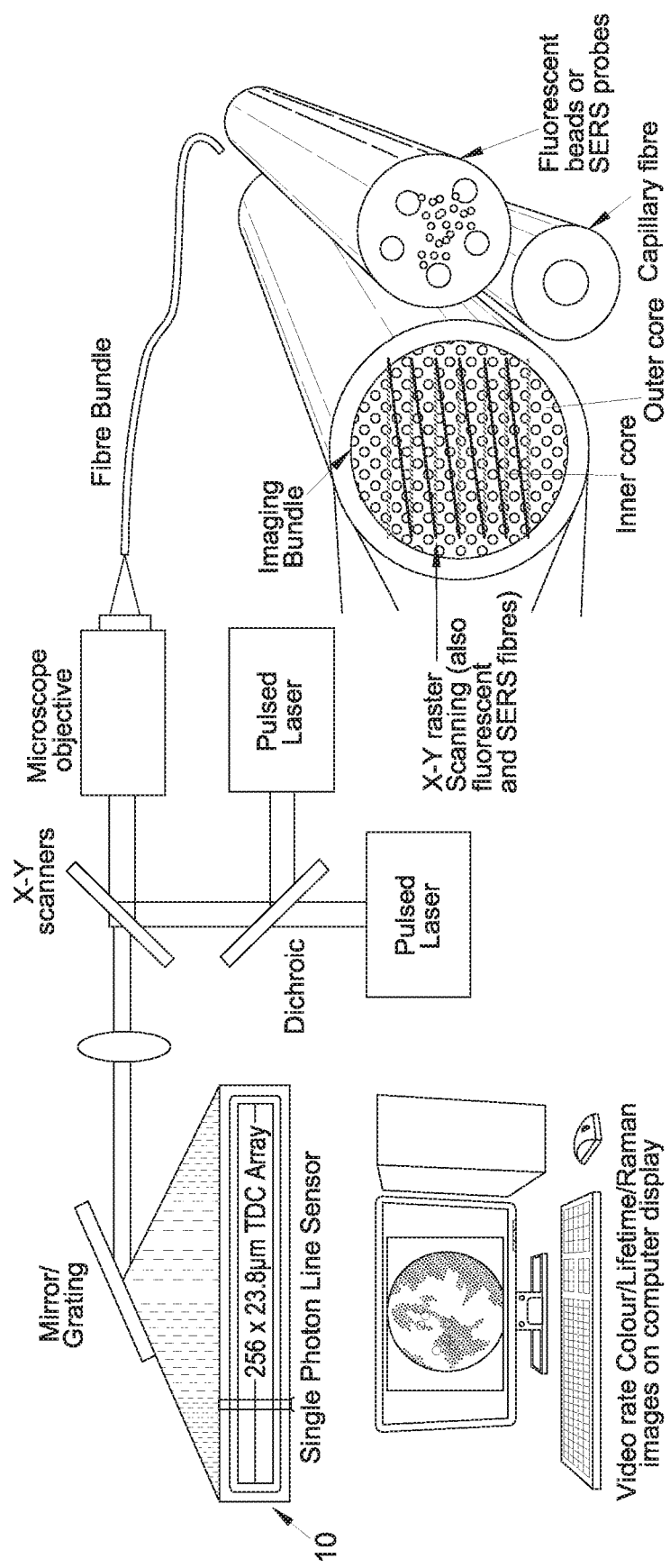
FIG. 1 is a schematic diagram of a photon sensor apparatus.

An example arrangement for a photon sensor apparatus for measuring properties of a sample is shown in FIG. 1. The photon sensor apparatus has a photon sensor 10. An optical instrument, for example, an endoscope is provided. The optical instrument has a fibre bundle that comprises an imaging bundle, a capillary fibre and a fluorescent bead and/or Surface Enhanced Raman Spectroscopy (SERS) fibre. Two pulsed lasers are in optical communication with the fibre bundle via suitable focusing means and a microscope objective. The suitable focusing means may be a dichroic mirror.

Pulsed laser light from the lasers is coupled into the multimode fibre and used to illuminate the sample. In response to illumination of a sample, photon detection events occur. Detection events vary depending on application. For example, the detection events may arise from fluorescence scattering and/or Raman scattering. Signals are received by the fibre bundle and sent to the photon sensor apparatus via a mirror or grating. Data from the line sensor is then sent to a computer and displayed on the display.

Figure 2:
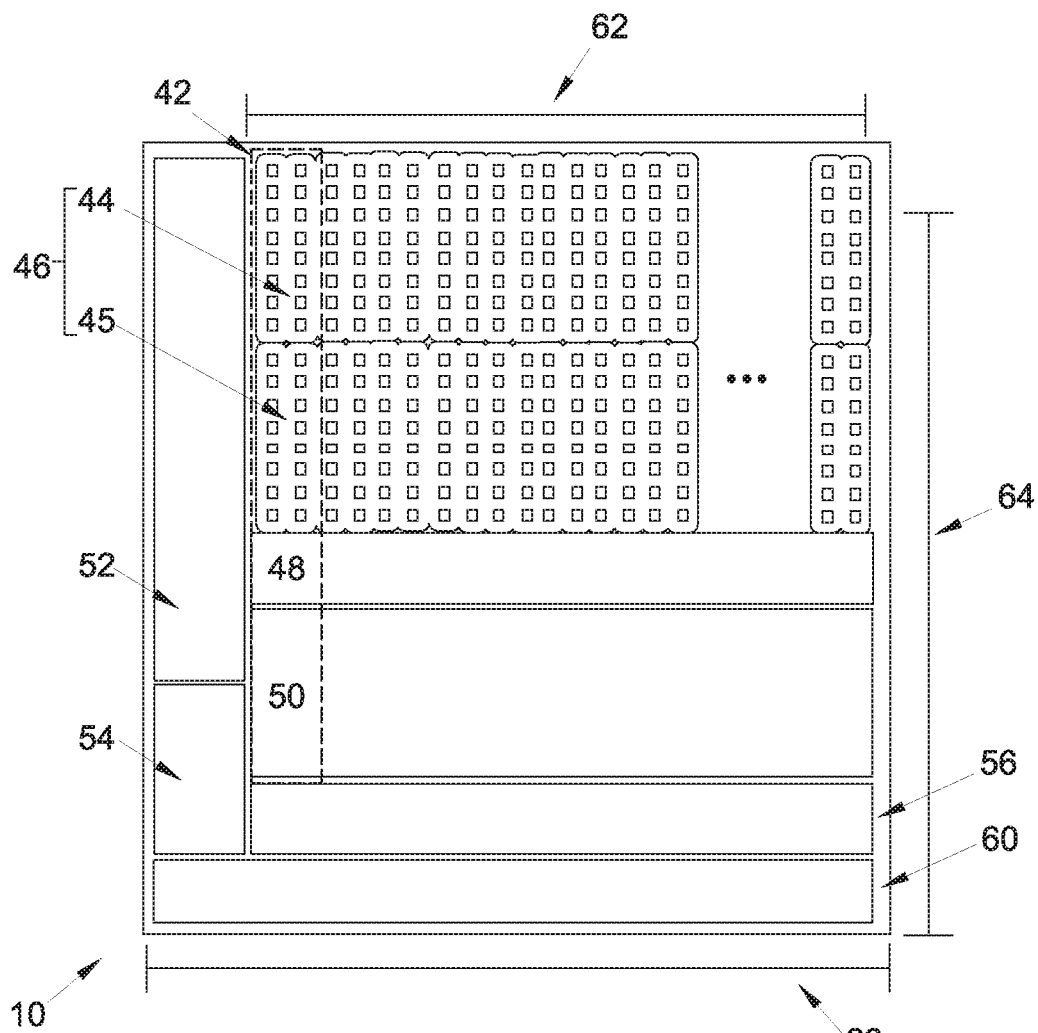
FIG. 2 is a schematic diagram showing in overview the architecture of a photon sensor chip according to an embodiment.

An example embodiment of the photon sensor 10 is shown in FIG. 2. The photon sensor 10 has a pixel array including 1×512 pixels. The sensor architecture can provide a 1M spectra per second read out and video rate photon counting/coarse time correlated single photon counting (TCSPC) for scanned operation. The sensor structure provides, amongst other operating modes on-chip and in-pixel real-time histogramming capability. The sensor structure also provides zooming and shifting capabilities to the in-pixel histogramming.

An illustrative pixel device 42, also referred to as a pixel for brevity, of the pixel array is shown in FIG. 2. The pixel 42 includes two sets of eight "red" single-photon avalanche diodes (SPADs) 44 and two sets of eight "blue" SPADs 45. Although red and blue SPADs are provided in the embodiment of FIG. 2, in alternative embodiments any other suitable arrangement of different SPAD device specifications including but not limited to differently colour sensitive SPADs may be provided, or all SPADS may have an identical specification for example the same wavelength sensitivity profile and/or all SPADs may be any mix of SPAD specifications.

The red SPADs 44 are sensitive to light in the range 600 nm to 900 nm. The blue SPADs 46 are sensitive to light in the range 450 nm to 550 nm. The two sets of red SPADs 44 and the two sets of blue SPADS 45, collectively form a pixel SPAD array 46. The pixel 42 also has a dedicated processing resource, for example a Time to Digital Convertor (TDC) 48, and a per-pixel memory resource 50 arranged in pixel. The TDC provides photon detection event signals, for example in the form of time stamp data, digital timing signals or other representation of the time an event occurs. A further processing resource associated with the per-pixel memory resource 50 is provided per pixel to process photon detection event signals to obtain detection data. The further processing resource may be provided as part of the per-pixel memory resource or as a separate component. The initial processing resource, per-pixel memory resource 50 and further processing resource are configured to perform in accordance with an operating mode of the sensor. The sensor also has a global processing resource in the form of a control module 52 and a delay generator 54. The control module 52 may include configuration registers that store the values of various configuration parameters. The sensor 10 also includes a communications resource in the form, in this embodiment, of a sensor output bus that includes a serialiser 56, and a readout module 60. The sensor output bus enables transmission of detection and other data from the sensor 10 to an external processing resource (not pictured).

The illustrative pixel device 42 has "red" and "blue" SPADS. However, the pixel device 42 is illustrative only. For example, the pixel device may also be implemented using only SPADs with identical specifications.

A moment of arrival of a single photon is registered as a change in state of the SPAD, for example from an un-activated state to an activated state. Following activation, each SPAD has an intrinsic dead-time period that typically lasts 10 s of nanoseconds. After the dead time period has expired the SPAD resets to its original, un-activated state.

The width of each pixel is 23.78 μm and therefore the pixel array has a width, as indicated by 62, equal to approximately 12.175 mm. The sensor 10 has a height indicated by 64, less than or equal to 2 mm. The sensor has a width 66 equal to approximately 13 mm. The above dimensions are provided for illustrative purposes only and other dimensions and shapes are possible. The pixel array, and the individual pixels can be of any suitable shape and size. As shown in FIG. 2, the pixel array may be a one dimensional array having a width of one pixel to form a line sensor for spectrometry or line scanning. Alternatively, the pixel array may be a two dimensional array having both a length and width greater than one pixel to form an image sensor.

It is a feature of the embodiment that the sensor 10 has some of the memory and processing components placed on-chip, alongside the SPAD array, which may be used to ensure that only selected data is processed and/or transmitted and/or stored.

The photon sensor 10 may operate in one of a variety of operating modes, the choice of which determines how a per-pixel memory resource 50 is used. Of particular interest is an on-chip histogramming mode, and operation in this mode is described with reference to FIGS. 3, 4 and 5. Other operating modes include single photon counting (SPC) mode (time gated) where the memory has two counters, counter A and counter B, both counters having, for example, 10-bit and 20-bit modes. Other operating modes also include TCSPC operating mode in, for example, 11-bit or 17-bit modes.

Figure 3:
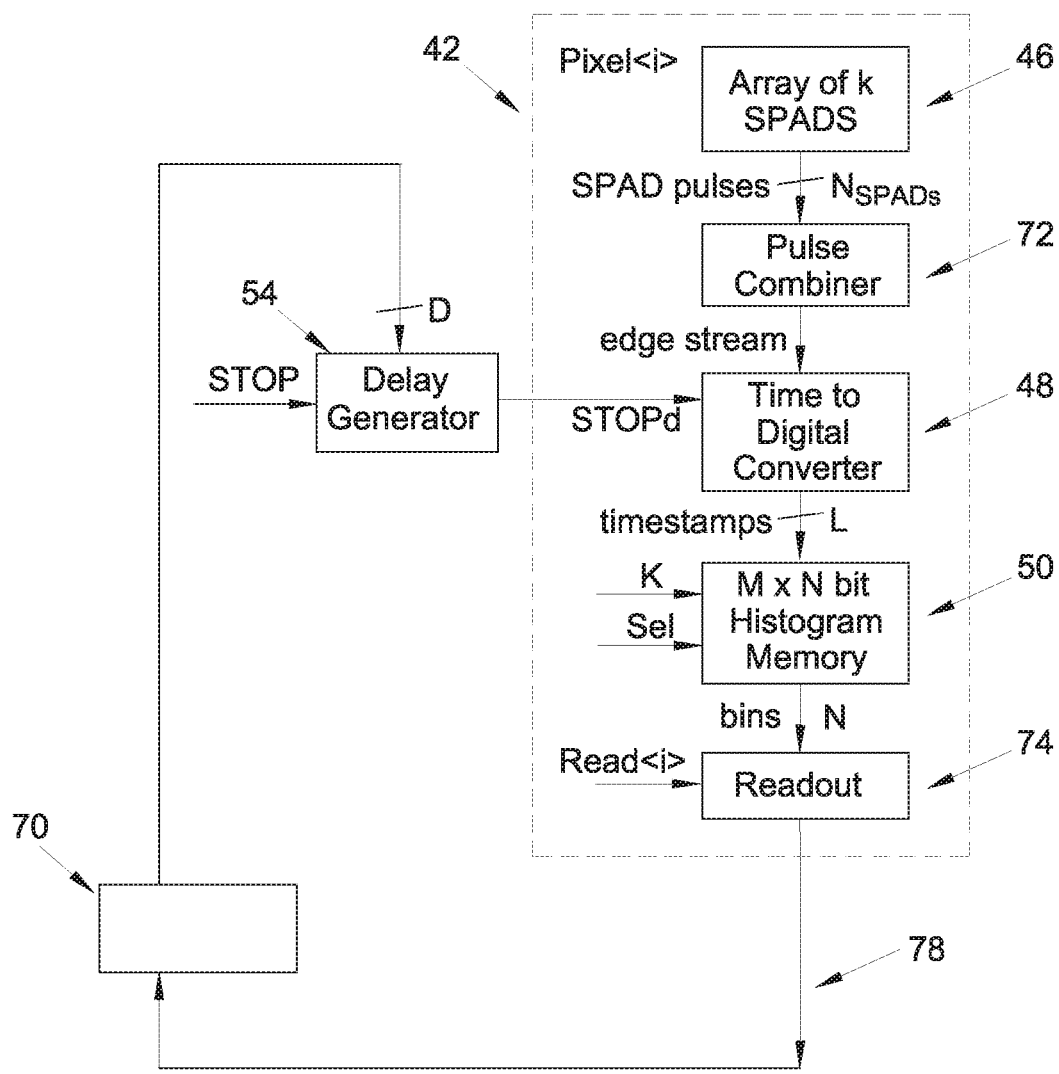
FIG. 3 is a schematic diagram of a pixel element of the photon sensor apparatus.
Figure 4A:
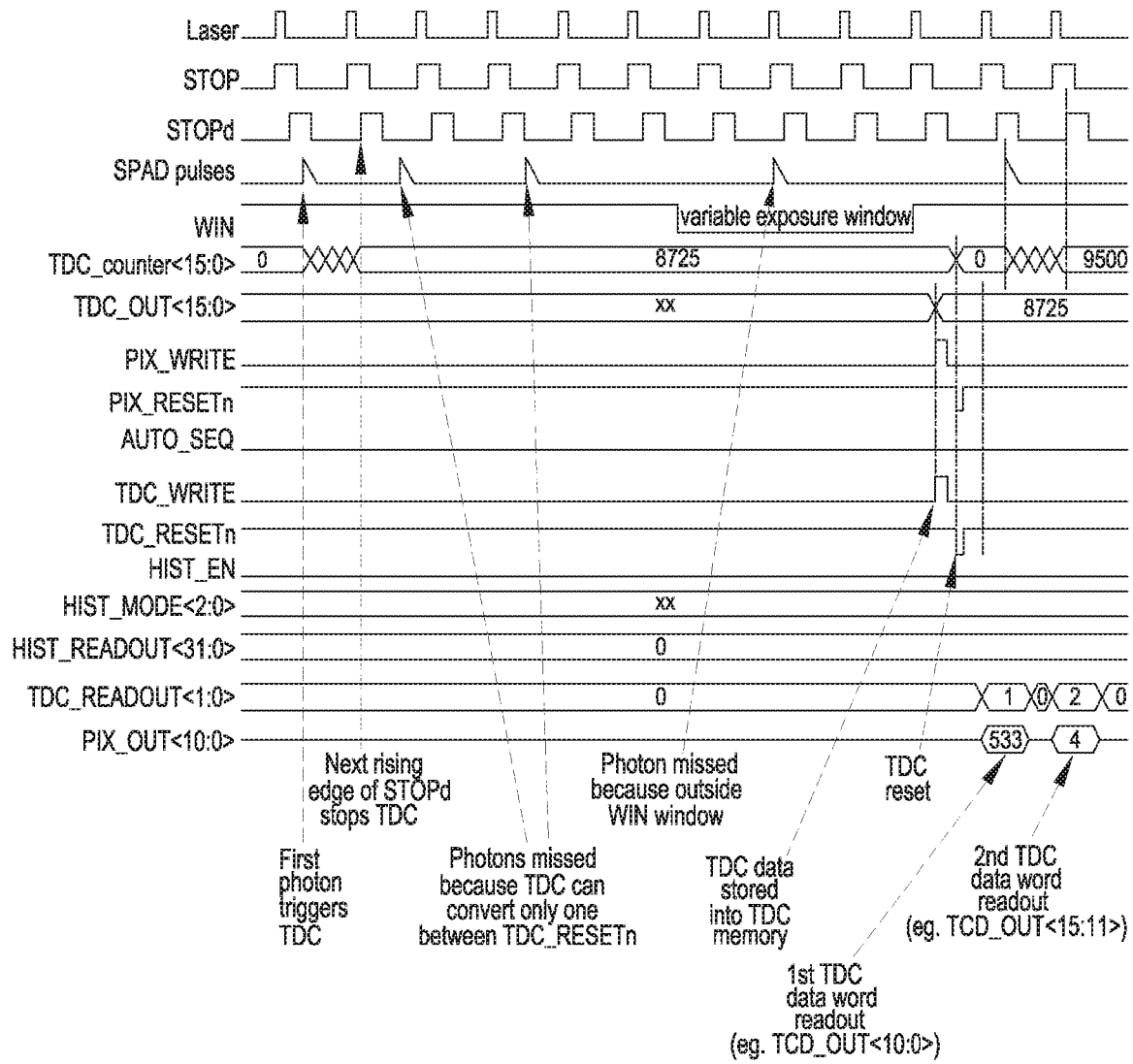
FIGS. 4(a) and 4(b) are timing diagrams for a subset of signals generated and received by the photon sensor apparatus.
Figure 4B:
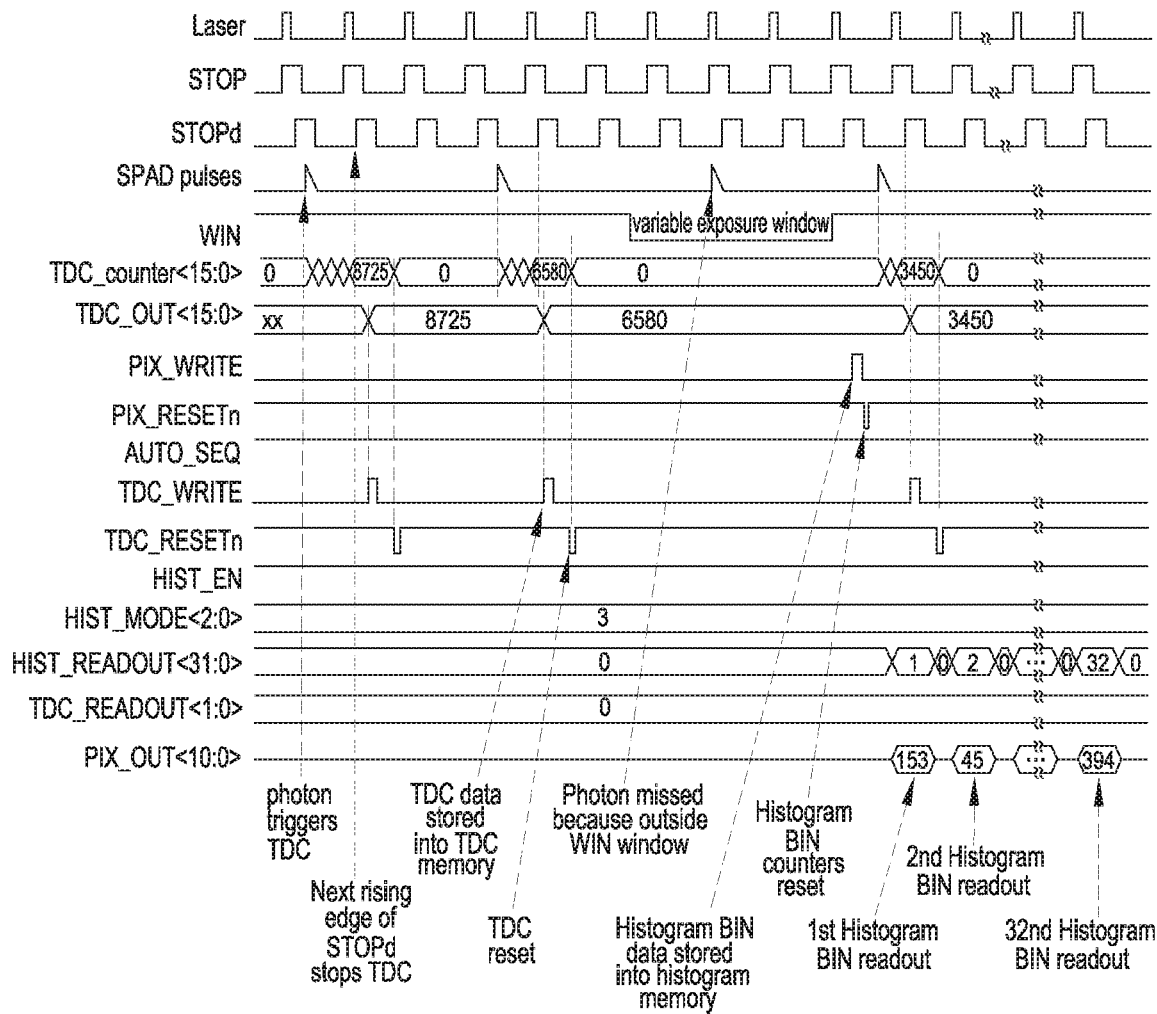

FIG. 3 is a flow chart and schematic diagram illustrating a sequence of operations performed by circuitry components and processing logic of the pixel 42 of the sensor. FIG. 3 shows the pixel SPAD array 46 for detecting light, the TDC 48, and the per-pixel memory 50 of the pixel 42. FIG. 3 also shows the delay generator 54. A controlling resource 70 is also shown. The controlling resource 70 may be provided as part of the on-chip controller 54 or provided off-chip. In addition to the above pixel components, the pixel also has pulse combining circuitry 72, a further processing resource, for example a decoder (shown in FIG. 3 as part of the per-pixel memory 50) and a readout module 74.

In some embodiments, a single TDC, or at least some components of a TDC, is shared by a plurality of the pixels 42. Thus timestamps or other timing information for a plurality of the pixels 42 may be generated in such embodiments by a common TDC or by TDCs sharing at least some common components. Such sharing of TDCs may enable a reduced circuit area and power consumption, but may lead to more SPAD events being missed in some cases.

The delay generator 54 is a global component that is coupled to all pixels. As described in more detail below, the delay generator 54 provides a global modified clock signal to the pixels, indicated by STOPd. In particular, the modified clock signal is provided to the TDC 48. The modified clock signal generally coincides with occurrence of fluorescence or other photon emission process from a subject that causes photon detection events to occur at the sensor apparatus. The components of the pixel 42 are arranged such that the time of arrival of a photon at the array of SPADs 46 is measured with reference to the modified clock signal provided by the delay generator 54. The processing logic of the pixel 42 can provide measurements of time of arrival of a plurality of photons, which may for example be referred to as photon detection event signals, and to sort and/or otherwise process the measurements to produce and store a timing distribution, for example a histogram, across the per-pixel memory resource 50, which may for example be referred to as detection data. The pixel 42 can provide a readout signal, which may comprise or represent detection data, from the sensor output bus that represents the time distribution of detected photons at the SPAD array over a detection period. The time distributions are provided per-pixel and therefore, the sensor 10 provides time distributions for every pixel.

In further detail, each SPAD of the pixel SPAD array 46 is coupled to the pulse combiner 72 via a plurality of SPAD pulse channels, wherein each SPAD has a respective SPAD pulse channel. Each SPAD has corresponding processing logic (not shown) that includes a front end, a digitizer, a digital buffer, and quenching circuitry, which may be either active or passive. The digital buffer acts to isolate SPAD capacitance from being loaded by subsequent circuit and to transmit pulse signals to the pulse combining circuitry 72.

The pulse combiner circuitry 72, which forms part of the pixel processing logic in some embodiments, couples the SPAD array 46 to the TDC 48. The pulse combiner circuit acts as a compressor and combines the SPAD outputs into a single combined channel. The single channel provides one short pulse per photon count. The relatively long SPAD pulses (tens of ns) are compressed in time by the pulse combiner circuitry 72, thereby removing any dead time of SPAD pulses. The relatively long SPAD pulses (tens of ns) are first compressed in time by a monostable and then ORed together through an OR tree (spatial compression).

In an example implementation, where the SPAD array includes red and blue SPADs, the SPAD pulses from the red SPADs are combined separately from the SPAD pulses from the blue SPADs. In this example, either the blue or the red pulse stream is selected for the next processing step. The pulse combiner 72 provides an efficient means of reducing hardware requirements of other stages of the sensor, for example, TDC 48 and per-pixel memory resource 50. Some spatial information relating to the precise origin of the pulse signal is lost by combining the SPAD channels. For example, on examining a combined pulse signal it may not be possible to determine from which individual SPAD a pulse has originated.

The TDC 48, which forms part of the pixel processing logic, is configured to receive the single channel input from the pulse combiner circuitry 72 and the delayed clock signal from the delay generator 54, which acts as a global clock signal for each of the pixels of the sensor. The TDC 48 is configured to process these inputs and produce a photon detection event signal comprising time data representative of a detection time at which a photon detection event occurred.

The system can be configured to operate in different modes, for example TCSPC mode and histogramming mode. The TDC and other components can operate differently in TCSPC and histogramming mode. Further description of operation in TCSPC and histogramming modes is provided below in relation to FIG. 4.

In histogramming mode, the TDC 48 is configured to process these inputs and produce a photon detection event signal comprising time data representative of a detection time at which a photon detection event occurred for each pulse of the combined pulse signal. The TDC can be a gated ring oscillator TDC.

Figure 7:
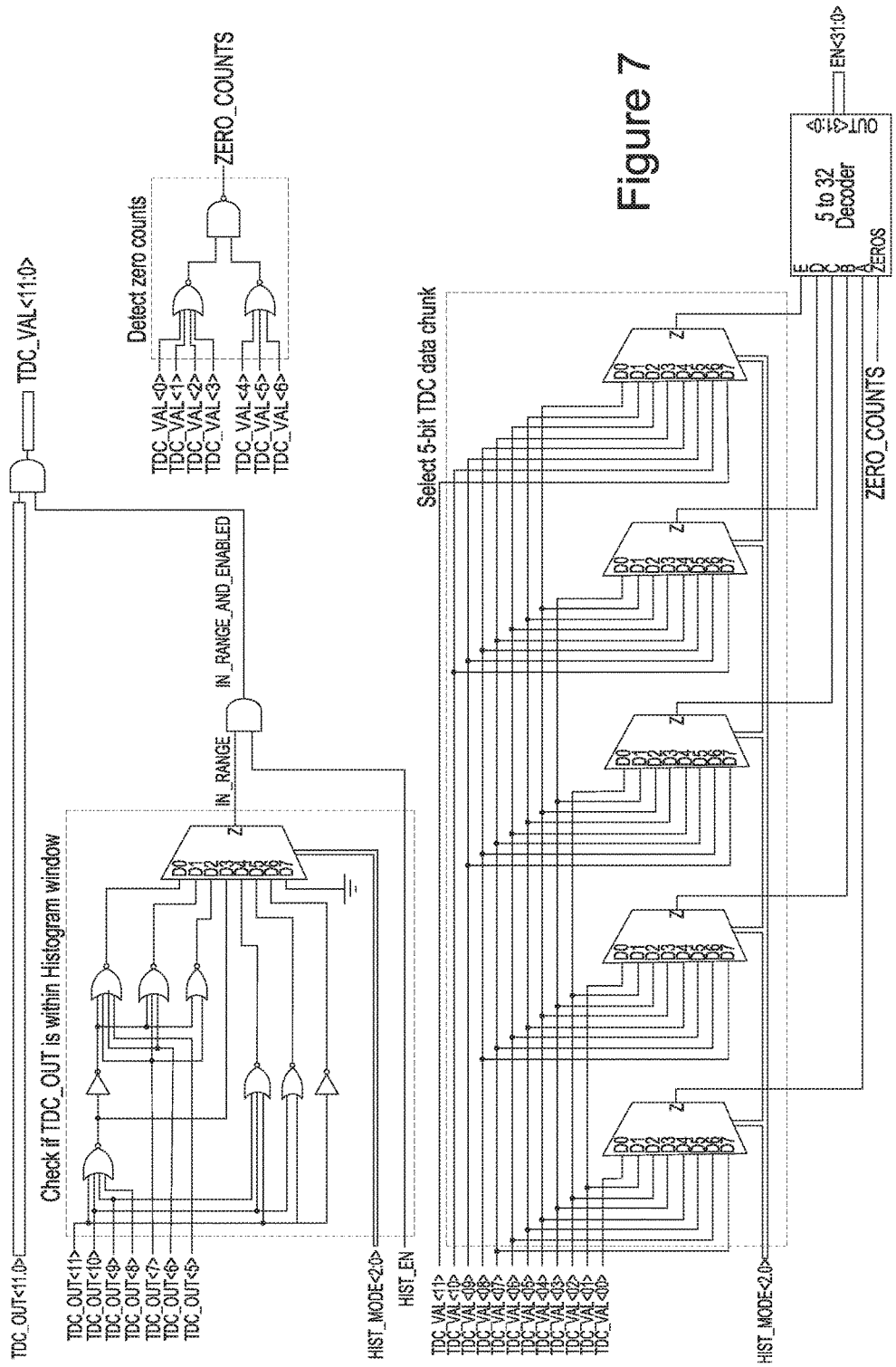
FIG. 7 is a circuit diagram of a histogram decoder.

The decoder, for example as shown in FIG. 7, which forms part of the pixel processing logic, may form a separate component of the pixel or form part of the per-pixel memory resource 50. Alternatively, the decoder may form part of the TDC 48. The decoder provides an interface between the TDC 48 and the memory resource 50. The decoder is configured to produce decoded signals based, at least in part, on the photon detection event signals generated by the TDC 48 and at least one control parameter. The control parameter may be a zooming parameter that indicates, or that can be used to determine the resolution of, a histogram. The operation of the decoder is described in further detail below.

Under user control, allocation of time domains to bins across the whole of the histogram can be successively improved in a "zooming" process until only the region containing useful information is spanned. Since it is not necessary to store all of the data that would normally be stored off-chip at any given time, it is possible to realise highly time resolved data with modest amounts of on-chip memory per pixel. Since this memory does not occupy too much area, it can be added to each pixel, while maintaining a reasonable fill factor for the optically sensitive area.

Each per-pixel memory resource 50 is partitioned into a number of memory portions, each memory portion acting as a time bin, for example for use in a histogramming process. The memory partitions may be counters. The decoder acts to provide decoded signals to a corresponding memory portion and the corresponding memory portion counts the received decoded signals. The per-pixel memory resource therefore produces and stores count data, for example count values, that represents a time distribution of photons, in the form of a histogram. Through for example the zooming parameter, or using any other suitable process, the decoder can set the histogram time resolution. The per-pixel memory resource 50 can be implemented in a number of alternative ways, including an array of ripple counters. The decoder may be implemented as a chain of logic gates, which selects one histogram bin to be incremented by one count.

The pixel also has a pixel readout module 74 configured to receive a read signal from either another component of the sensor or externally from the sensor. In response to receiving the read signal, the readout module 74 is configured to produce a pixel output signal 78 that represents the state of the memory resource. The pixel readout module 74 provides pixel output to the sensor output bus.

The delay generator 54 is configured to receive a delay parameter. The delay parameter is generated by the controlling resource 70 based either on a user input value or the pixel output 78. The controlling resource 70 can provide a feedback loop between the pixel 42 and the delay generator 54. The delay generator 54 is configured to receive a STOP signal synchronised with pulses of the laser and to adjust the STOP signal using the delay parameter to produce a delayed STOP signal. In a particular embodiment, the STOPd signal is a copy of STOP signal delayed by a timing of D×Tdel, where D is the delay parameter and Tdel is a basic delay resolution of a Delay Locked Loop (DLL) or programmable delay chain.

In use, in histogramming mode, a photon emission event occurs and a photon is incident on a SPAD of the pixel SPAD array 46 causing the pixel SPAD array 46 to produce a SPAD pulse. The SPAD pulse is transmitted from the SPAD to the pulse combiner 72 via its processing logic. The pulse combining circuitry 72 provides a combined pulse signal to the TDC 48. The TDC 48 generates photon detection event signals, in the form of timestamps, for each pulse of the combined pulse signal. Timestamps are produced for substantially each pulse of the combined pulse signal that is received by the TDC 48. It is noted that the time it takes for the TDC to process a detected SPAD event (e.g. generate a time stamp) may, in some cases, lead to missed pulses. For example, if generated SPAD pulses are too close to each other the TDC may not be able to process the next SPAD pulses being finishing processing the current SPAD pulse.

The decoder decodes the timestamps to produce a decoded signal and distributes the decoded signal to the correct portion of the per-pixel memory resource 50, e.g. representing a particular time bin, thereby increasing a count of the respective memory portion. Following a burst of photons incident on the pixel SPAD array, a count distribution is stored over the portions of the per-pixel memory 50. In response to a read signal the readout module 74 transmits the readout signal 78 representing the state of the per-pixel memory 50. The transmitted signal includes the count distribution for the pixel.

Figure 5:
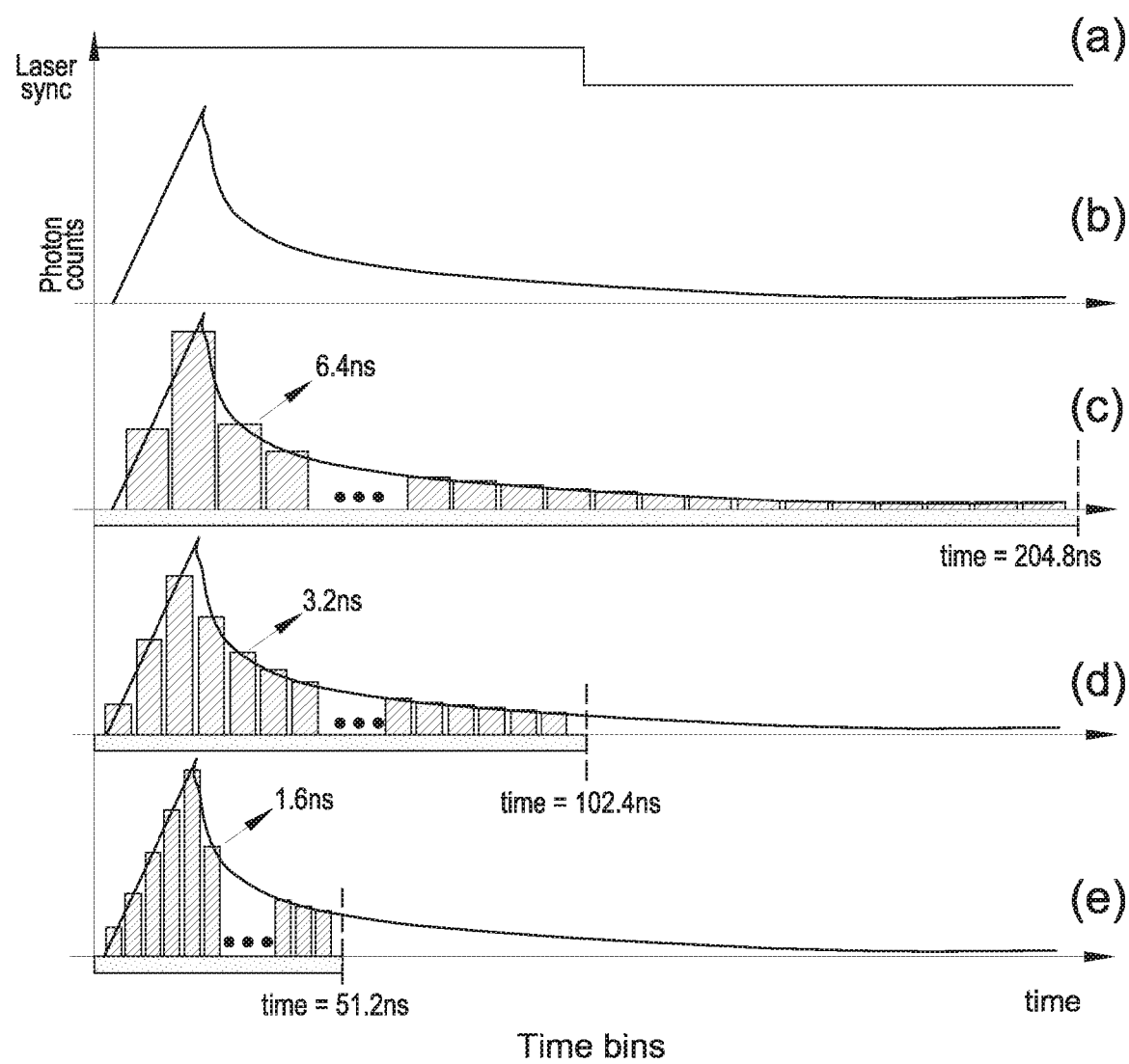
FIG. 5 are illustrative plots of histograms produced by the photon sensor apparatus.

The transmitted pixel signal is received by the sensor output bus together with pixel signals from other pixels of the sensor. Together, the pixel signals can be further processed to produce a sensor array histogram. As example, sensor array histogram is shown in FIG. 5. Photons can be counted by summing histograms bins off-chip.

While described as separate functional modules with reference to FIG. 3, the TDC, decoder and memory may form part of a pixel processing logic circuit in communication with the delay generator that provides a STOP (or STOPd) signal. In one embodiment, the TDC includes a gated ring oscillator, a ripple counter, and a shift register and the decoder includes a logic chain, for example as shown in FIG. 7. The memory resource, in this embodiment is provided by an array of ripple counters implementing the in-pixel histogram, see for example FIGS. 6 and 8. In operation, a SPAD fires to start the gated ring oscillator (GRO) that operates the ripple counter in the TDC. This generates a clock for the shift register which clocks in a 1. The STOP pulse samples the state of the shift register to generate a thermometer code which is decoded by the XOR chain to increment a single bin of the array of ripple counters implementing the in-pixel histogram. The STOP signal samples how long the shift register has been shifting along a 1 which then directly activates a corresponding histogram bin. The shift register may be operated from a divided version of the GRO output. In some embodiments, a decoder is not required if the other components of the pixel processing logic are arranged such that a single 1 can be shifted along.

Turning to FIGS. 4(*a*) and 4(*b*), typical timing diagrams for the sensor in different operating modes are provided. FIG. 4(*a*) shows a timing diagram for operation of the system in TCSPC mode. TCSPC is a favoured technique for low light time-resolved imaging due to its photon efficiency and specificity. FIG. 4(*b*) shows a timing diagram for operation of the system in histogramming mode. The operation of the TDC, memory resource and decoder is dependent on the operating mode of the sensor.

For example, as can be seen in FIG. 4(*a*), for operation in TCSPC mode, a photon detection event signal, for example a timestamp, is generated by the TDC only for the first photon captured within an exposure time window. For operation in histogramming mode as shown in FIG. 4(*b*), a photon detection event signal is generated for each pulse of the combined SPAD pulses.

Both FIGS. 4(*a*) and 4(*b*) show seventeen waveforms. The first and uppermost waveform is that produced by a pulsed laser. The pulsed laser generates a stimulus for example, for a time of flight system or a fluorescence/Raman microscopy or spectroscopy system. In another example, a laser capable of generating short pulses typically at MHz rates may be employed to excite a sample or to generate an echo within a pulsed LIDAR system. A second waveform, the STOP clock, is synchronised to the laser pulse. The STOP clock is usually derived from a SYNC output from the laser. The STOP clock signal provides a reference signal against which arrival of photons can be measured. The STOP clock signal is provided to the delay generator 54, and may be delayed by a set time as described elsewhere to provide the third waveform STOPd. The fourth waveform shows SPAD pulses. The fifth waveform is a variable exposure window (WIN) signal.

The sixth and seventh waveforms are TDC waveforms, corresponding to a TDC counter (TDC_counter) and TDC output (TDC_OUT) waveform. The eighth waveform is a pixel write waveform (PIX_WRITE). The ninth waveform is a pixel reset waveform (PIX_RESETn). Pixel reset signal is generated externally (through an FPGA board) together with some other control signals, for example, PIX_WRITE. The time interval between the pixel reset signals define the exposure time (however, only SPAD events which are within the active window (i.e. WIN in FIG. 4(*a*)) are considered in each exposure cycle).

The tenth waveform is an AUTO_SEQ signal. The eleventh and twelfth waveforms correspond to a TDC write signal (TDC_WRITE) and a TDC reset signal (TDC_RESETn). The thirteenth waveform (HIST_EN) corresponds to parameter Sel, which is a control register bit that enables histogramming mode in the memory resource. A histogram mode parameter (HIST_MODE) control signal is the fourteenth waveform. This control signal is described in further detail with reference to Tables 1, 2 and 3. The fifteenth, sixteenth and seventeenth waveforms are a histogram readout waveform (HIST_READOUT), a TDC readout (TDC_READOUT) and a pixel output signal (PIX_OUT).

Differences between TCSPC mode and histogramming mode are evident on a comparison of FIGS. 4(*a*) and 4(*b*). For example, in TCSPC mode a timestamp is generated only for the first photon captured within the exposure time. Furthermore, in TCSPC mode Histogram memory is bypassed and a generated timestamp is readout directly.

In histogramming mode, the TDC can convert many more SPADs within the exposure time and each converted SPAD is used for building the histogram (by incrementing one histogram BIN). In this mode TDC_WRITE and TDC_RESETn control signals are generated automatically on-chip and independently for each pixel (separate from global PIX_WRITE and PIX_RESETn signals) by setting AUTO_SEQ control signal to HIGH, as shown in FIG. 4(*b*). In histogramming mode, multiple photon events are converted during a single exposure cycle by these TDC reset and TDC write signals. In contrast, in TCSPC mode, only one photon event is converted per exposure cycle and all TDCs (of all pixels) are reset by the global pixel reset signal (PIX_RESTn).

With reference to FIG. 4(*b*), and operation in histogramming mode, a photon is detected thus producing a detection signal in the form of a SPAD pulse (as seen in the fourth waveform). The SPAD pulse triggers the TDC counter signal, and the subsequent STOPd rising edge stops the TDC counter. TDC write and TDC reset control signals are automatically generated on-chip and independently for each pixel. These two TDC control signals are generated independently from the global pixel write and pixel reset signals. In response to receiving the TDC write control signal, the TDC writes the TDC value to memory. In response to receiving the TDC reset control signal, the TDC counter is reset to zero. As seen in FIG. 4(*b*), a global pixel write control signal (PIX_WRITE) is sent to all pixels. On receiving the global pixel write control signal, current histogram bin counts are stored into histogram memory and the histogram bins are cleared on receiving the global pixel reset control signal (PIX_RESETn). This is then followed by reading out each histogram bin under the control of HIST_READOUT control signal.

The histogram memory may be reset by the global reset signals. However, in histogram mode, after detecting a photon event (e.g. generating a timestamp) the TDC data is sent to the histogram module for further processing and TDC counters are reset automatically (see for example, control signals AUTO_SEQ, TDC_WRITE and TDC_RESETn in FIG. 4(b)).

Returning to FIG. 3, zooming and delay functionality of the pixel is now described. The timing signals transmitted from the TDC 48 comprise a large number of timestamps (typically between 1 k and 1M) as, in histogramming mode, a timestamp is produced for substantially every photon received by the TDC during the detection period. Each timestamp has a size that is determined by the TDC 48. For example, a TDC may be configured to output a timestamp that is an L-bit word. An L-bit timestamp can store information corresponding to $2^L$ time intervals, in this way each TDC has an in-built maximum time resolution.

The memory resource 50 has a defined number of partitions or counters, each counter having a predetermined size. Each counter is a suitable size to store count information. For example, a counter having an M-bit size can count up to $2^M$ occurrences of an event.

Example values are L=10 and M=8. As a comparative example, it is considered how large a memory resource needs to be to store timing information for events at the maximum time resolution. For the above values and at this resolution, $2^L=1024$ counters (a counter for each time interval) are required, where each counter is 8-bit (1 byte). To store timing information at this resolution, a memory is 1024 bytes in size for each pixel. Such a size is prohibitively large for an on-chip per-pixel memory.

Therefore, per-pixel memory resource 50 is provided with a reduced number of memory portions, where each memory portion corresponds to a respective time bin. There are N time bins in total, where $N<2^L$. By reducing the number of bins, the per-pixel memory area overhead required is reduced and the memory resource 50 is placed within the pixel 42. Memory placed within a pixel can achieve 100 s MHz accumulation of timestamps due to the proximity of memory to the TDC 48. In the embodiment, histogram zooming is implemented by selecting different bits of the TDC output.

The per-pixel memory resource is sized M×N bit, where N is the number of time bins for a histogram and M is the size of each counter for each bin. The pixel decoder receives L-bit timestamps, selects a portion of L-bit timestamps and determines to which bin the selected portions of L-bit timestamps should be allocated.

In an example implementation, the pixel decoder receives input signals containing configuration parameters K and Sel. Parameter K may be considered as a zooming parameter and its value determines the size of the time bins. Sel is a control register bit that enables the histogramming mode in the memory resource. The input signals K and Sel are indicated as HIST_MODE and HIST_EN respectively in FIG. 4(a) and FIG. 4(b). The decoder selects a first portion of the L-bit word determined by the values of K and N, in particular, the decoder selects the portion of the L-bit word corresponding to bits K to K+$\log_2$ N−1. This selection may be considered to effectively exclude at least some of the bits when performing the histogramming. This decoded signal, therefore has a size equal to $\log_2$ K. By performing the same operation on each L-bit timestamp, the time interval of each histogram bin is scaled by a factor dependent on zooming parameter K. K can be chosen to be any value from 0 to L−$\log_2$ N. Selection of zooming parameter K increases the bin time width from the TDC resolution bin width by a factor of $2^K$.

An example implementation of on-chip histogram option is shown in FIG. 5 and in Tables 1, 2 and 3. In this particular implementation, options are specified for a 12-bit (L=12) TDC with a time resolution of 50 ps. In this case, K can be any value from 0 to 7, for example set automatically or based upon user input. The selection or varying of the value of K can effectively select or vary the time width of the bins, and thus effectively select or vary a level of histogram zooming. Options 1 to 8 are shown in Table 1 and these options correspond to values of K from 7 to 0. Histograms produced under options 1, 2 and 3 are shown in FIG. 5. In this example implementation, the number of time bins, N=32. In this implementation, a 5-bit portion of the 12-bit TDC timestamp is selected. As $2^5$=32, the selected 5-bit portion represents one of the 32 possible time intervals represented by the time bins and therefore determines which bin the photon should be allocated to.

FIG. 5(a) shows a laser sync signal corresponding to the STOP signal received by the TDC. FIG. 5(b) shows an actual response curve corresponding to a fluorescence or other photon emission process measured with photon counts over time. The response curve has a first sloping segment up to a peak and a decaying segment after the peak. The histograms shown in FIGS. 5(c) to 5(e) are produced by the system represent the shape of the response curve at consecutively finer resolutions.

Selecting option 1 corresponds to selecting K to be the largest possible value, 7. A plot of a resulting histogram is shown in FIG. 5(c). This choice causes the decoder to select a 5-bit portion of the 12-bit timestamp output by the TDC, the portion corresponding to bits 7 to 11 of the 12-bit timestamp. The decoder then assigns the 5-bit portion to the histogram memory (i.e. histogram bins). Bits 0 to 6 determine the level of binning. In this case, bits 0 to 6 correspond to 2^7=128 consecutive TDC codes. Therefore, TDC codes 0 to 127 are binned together in the first bin and the first bin counter incremented by one. Likewise, TDC codes 128 to 255 are binned together in the second bin and the second bin counter increment by one. In this way all 32 bins counters are updated. The total time range of the histogram in option 1 is 204.8 ns and the bin width is 6.4 ns.

Selecting option 2 corresponds to selecting K to be the second largest possible value, 6. A plot of a resulting histogram is shown in FIG. 5(d). This choice causes the decoder to select a 5-bit portion of the 12-bit timestamp output by the TDC, the portion corresponding to bits 6 to 10 of the 12-bit timestamp. The decoder then assigns the 5-bit portion to the histogram memory. Bits 0 to 5 determine the level of binning. In this case, bits 0 to 5 correspond to 2^6=64 consecutive TDC codes. Therefore, TDC codes 0 to 63 are binned together in the first bin and the first bin counter incremented by one. Likewise, TDC codes 64 to 127 are binned together in the second bin and the second bin counter incremented by one. In this way all 32 bins are provided with entries. Information held by bit 11 is not used. Losing the highest bit, bit 11, reduces the value of the total TDC range by half, compared to option 1. Hence the total time range of the histogram in option 2 is 102.4 ns and the bin width is 3.2 ns.

Selecting option 3 corresponds to selecting K to be the third largest possible value, 5. A plot of a resulting histogram is shown in FIG. 5(*e*). This choice causes the decoder to select a 5-bit portion of the 12-bit timestamp output by the TDC, the portion corresponding to bits 5 to 9 of the 12-bit timestamp. The decoder then assigns the 5-bit portion to the histogram memory. Bits 0 to 4 determine the level of binning. In this case, bits 0 to 4 correspond to 2^5=32 consecutive TDC codes. TDC codes 0 to 31 are binned together in the first bin and the first bin counter incremented by one. Likewise, TDC codes 32 to 63 are binned together in the second bin and the second bin counter incremented by one. In this way all 32 bins are provided with entries. Information held by bits 10 and 11 is not used. Losing the highest 2 bits, bits 10 and 11, reduces the value of the total TDC range by half, compared to option 2. Hence the total time range of the histogram in option 3 is 51.2 ns and the bin width is 1.6 ns.

Further choices of K are shown in Table 1, 2 and 3. Selecting option 8 corresponds to selecting K to be the smallest possible value, 0. This choice causes the decoder to select a 5-bit portion of the 12-bit timestamp output by the TDC, the portion corresponding to bits 0 to 4 of the 12-bit timestamp. The decoder then assigns the 5-bit portion to the histogram memory. Therefore, timing information held by bits 5 to 11 is not stored.

For option 8 the bin width is 0.05 ns and the total TDC range is 1.6 ns. The resolution in this option corresponds to the inherent resolution of the TDC. In other words, the time bin width is equal to the time resolution of the TDC.

TABLE 1

Options provided for adjusting TDC range and histogram bin width

| | | Histogram bin width | |
|---|---|---|---|
| Option | TDC Range | with no bin chaining (32 bins, 10-bit/bin) | with bin chaining (16 bins, 20-bit/bin) |
| 1 | Full → 204.8 ns | 6.4 ns | 12.8 ns |
| 2 | Half → 102.4 ns | 3.2 ns | 6.4 ns |
| 3 | Quarter → 51.2 ns | 1.6 ns | 3.2 ns |
| 4 | 1/8 → 25.6 ns | 0.8 ns | 1.6 ns |
| 5 | 1/16 → 12.8 ns | 0.4 ns | 0.8 ns |
| 6 | 1/32 → 6.4 ns | 0.2 ns | 0.4 ns |
| 7 | 1/64 → 3.2 ns | 0.1 ns | 0.2 ns |
| 8 | 1/128 → 1.6 ns | 0.05 ns | 0.1 ns |

TABLE 2

Further parameters for modes presented in Table 1. HIST MODE <2:0> corresponds to value selected for K. Table 2 expresses the TDC range in nanoseconds for each selected mode. The total TDC range is calculated by multiplying the number of available time intervals ($2^{12}$ = 4096 in the first case) by the time resolution of the TDC (50 ps).

| | | | Histogram bin width | |
|---|---|---|---|---|
| HIST MODE <2:0> | Selected TDC bits | TDC Range | no bin chaining (32 bins, 10-bit/bin) | with bin chaining (16 bins, 20-bit/bin) |
| 7 | TDC<11:7> | 4096 × 50 ps = 204.8 ns | 6.4 ns (= 204.8/32) | 12.8 ns (= 204.8/16) |
| 6 | TDC<10:6> | 2048 × 50 ps = 102.4 ns | 3.2 ns (= 102.4/32) | 6.4 ns (= 102.4/16) |
| 5 | TDC<9:5> | 1024 × 50 ps = 51.2 ns | 1.6 ns (=51.2/32) | 3.2 ns (= 51.2/16) |
| 4 | TDC<8:4> | 512 × 50 ps = 25.6 ns | 0.8 ns | 1.6 ns |
| 3 | TDC<7:3> | 256 × 50 ps = 12.8 ns | 0.4 ns | 0.8 ns |
| 2 | TDC<6:2> | 128 × 50 ps = 6.4 ns | 0.2 ns | 0.4 ns |
| 1 | TDC<5:1> | 64 × 50 ps = 3.2 ns | 0.1 ns | 0.2 ns |
| 0 | TDC<4:0> | 32 × 50 ps = 1.6 ns | 0.05 ns | 0.1 ns |

TABLE 3

Further parameters for modes presented in Table 1. Table 3 expresses the same TDC range of Tables 1 and 2 as the available number of TDC codes, and histogram bin width is expressed as the number of TDC codes.

| HIST MODE <2:0> | Selected TDC bits | TDC Range | Histogram bin size (# TDC codes) | |
|---|---|---|---|---|
| | | | no bin chaining (32 bins, 10-bit/bin) | with bin chaining (16 bins, 20-bit/bin) |
| 7 | TDC<11:7> | 4095-0 | 128 (= 4096/32) | 256 (= 4096/16) |
| 6 | TDC<10:6> | 2047-0 | 64 (= 2048/32) | 128 (= 2048/16) |
| 5 | TDC<9:5> | 1023-0 | 32 | 64 |
| 4 | TDC<8:4> | 511-0 | 16 | 32 |
| 3 | TDC<7:3> | 255-0 | 8 | 16 |
| 2 | TDC<6:2> | 127-0 | 4 | 8 |
| 1 | TDC<5:1> | 63-0 | 2 | 4 |
| 0 | TDC<4:0> | 31-0 | 1 | 2 |

In Tables 1, 2 and 3 histogram bin sizes are described with and without bin-chaining. Bin-chaining allows two M-bit bins to be used as a single 2M-bit bin. As a consequence the bin size is doubled and the number of bins is halved.

Figure 6:
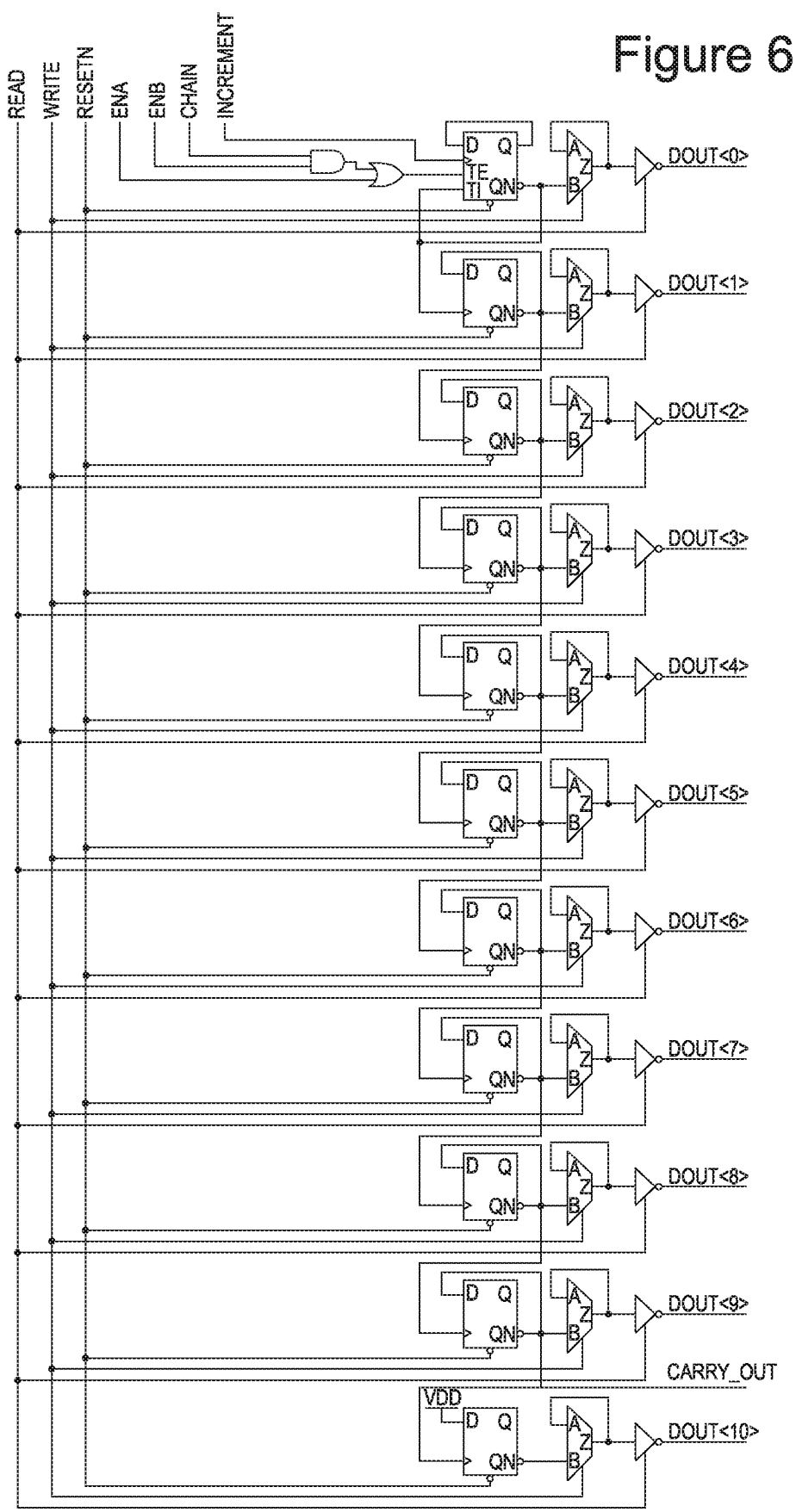
FIG. 6 is a circuit diagram of an 11-bit histogram bin.

A circuit diagram of an example implementation of an 11-bit histogram bin is shown in FIG. 6. Each bin is implanted as an 11-bit ripple adder, and a MUX-based tri-stated memory units. A circuit diagram of an example implementation of a 32 bin histogram is shown in FIG. 7.

In an example implementation of bin chaining, each BIN is implemented as in FIG. 6. In operation, in bin chaining mode, two 11-bit adders are simply chained together (the most significant bit of one adder is connected to the least significant bit of the other adder), forming a 22-bit adder (effectively 20-bit since the remaining 2 bits are overflow bits).

A circuit diagram of an example implementation of a histogram decoder which is an example of a further processing resource is shown in FIG. 7. The histogram decoder takes as input: a timestamp, from the TDC (TDC_out), a histogram mode (HIST_MODE) control signal and a histogramming mode enable (HIST_EN) control signal. The histogram mode control signal indicates the value of K, as described with reference to Tables 1, 2 and 3, is used.

Histogram decoder checks if TDC timestamp is within the histogram window using value of K. A 5-bit TDC data chunk is then selected from the TDC output using the value of K, as described with reference to Tables 1, 2 and 3. The 5 bit selected TDC data chunk is then converted by a 5 to 32 decoder and this output is then provided to the histogramming memory to increment the corresponding histogram bin counter.

Figure 8:
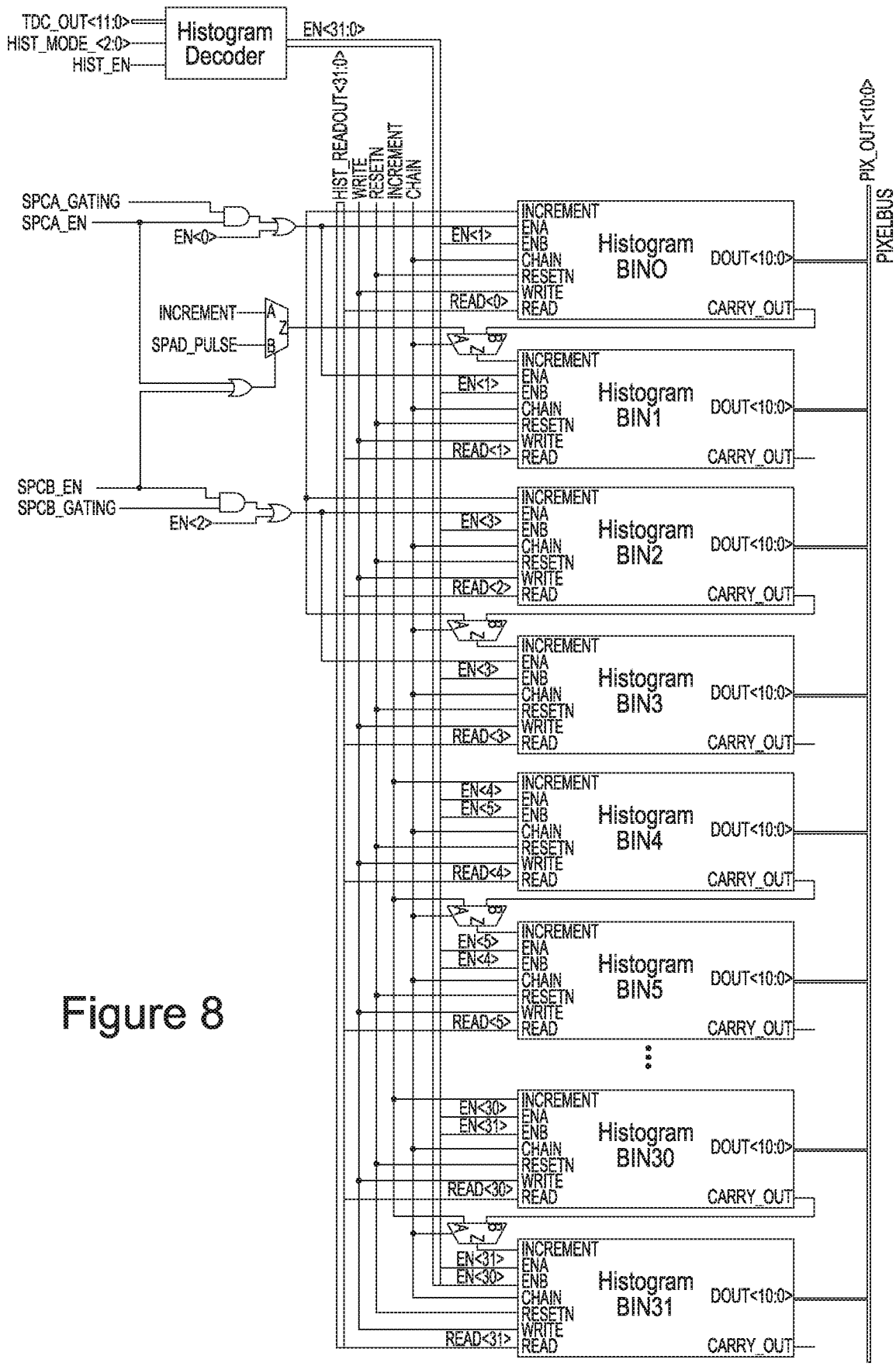
FIG. 8 is a circuit diagram of a 32-bin histogram memory.

A circuit diagram of 32 histogram BIN memory is shown in FIG. 8. FIG. 8 also shows two single photon counters, SPCA and SPCB, included, for operation in single photon counting mode. The histogram decoder, as described with reference to FIG. 7, outputs histogram bin information derived from TDC timestamp which increments the bin counters. Allocation may be performed sequentially.

In addition to the described zooming feature, the delay signal also provides a delay offset of histogram prior to zooming. The delay offset shifts a feature of interest, for example the peak and exponential decay so that this feature occupies the first bins of the histogram when these bins are expanded by a factor $2^K$. The parameter D shifts the sharp feature of a histogram corresponding to the laser pulse towards the first few bins of the histogram to allow effective zooming. This can be done automatically, or by a user of the system. Through the control resource 70, the system monitors and adjusts histogram peak position by using coarse bin sizes and progressively reducing K whilst adjusting the peak by precise choices of D. Zooming to features of an optical waveform around a sharp feature created by a pulsed laser is important for time of flight ranging systems as it gives a more precise distance estimation. Zooming and delay is also important for Raman spectrometry as it provides suppression of fluorescence component.

The use of a delay signal as outlined in the preceding paragraph can effectively be used to select a portion of a detection period (e.g. the portion of the detection period starting at or just before the feature of interest, such as the peak and subsequent decay) and exclude detection signals from before and/or after the selected portion of the detection period (e.g. detection signals, if any, obtained at times significantly earlier than the peak).

Any other suitable process can be used to select a detection period, or a portion of a detection period, that is to be used in a histogramming or other process. For example in some embodiments a thresholding process may be used to determine a time for which the number of counts reaches or exceeds a threshold level. The portion of a detection period before that point in time may then be excluded from use in a histogramming or other process, as it may be considered not to include sufficient useful data. Similarly, in some embodiments a thresholding process may be used to determine a time at which the number of counts has fallen below a further threshold level after the peak. Data after that point in time may for example then be excluded, effectively cutting off the end of a decay curve. In other embodiments, the detection period, or the portion of the detection period, to be used may be selected based on expected time period when photon detection events may be expected. For example, following application of a laser pulse to a subject there may be an expected dead time before photon detection events may be expected to begin, and there may be an expected length for a subsequent decay process during which the number of photon detection events falls from a peak to zero or to a threshold level. In some embodiments the sensor apparatus may be synchronised with operation of the laser such that the detection period is selected so that it matches a period for which useful or desired data, for example detection event signals, may be expected to be obtained.

Figure 9:
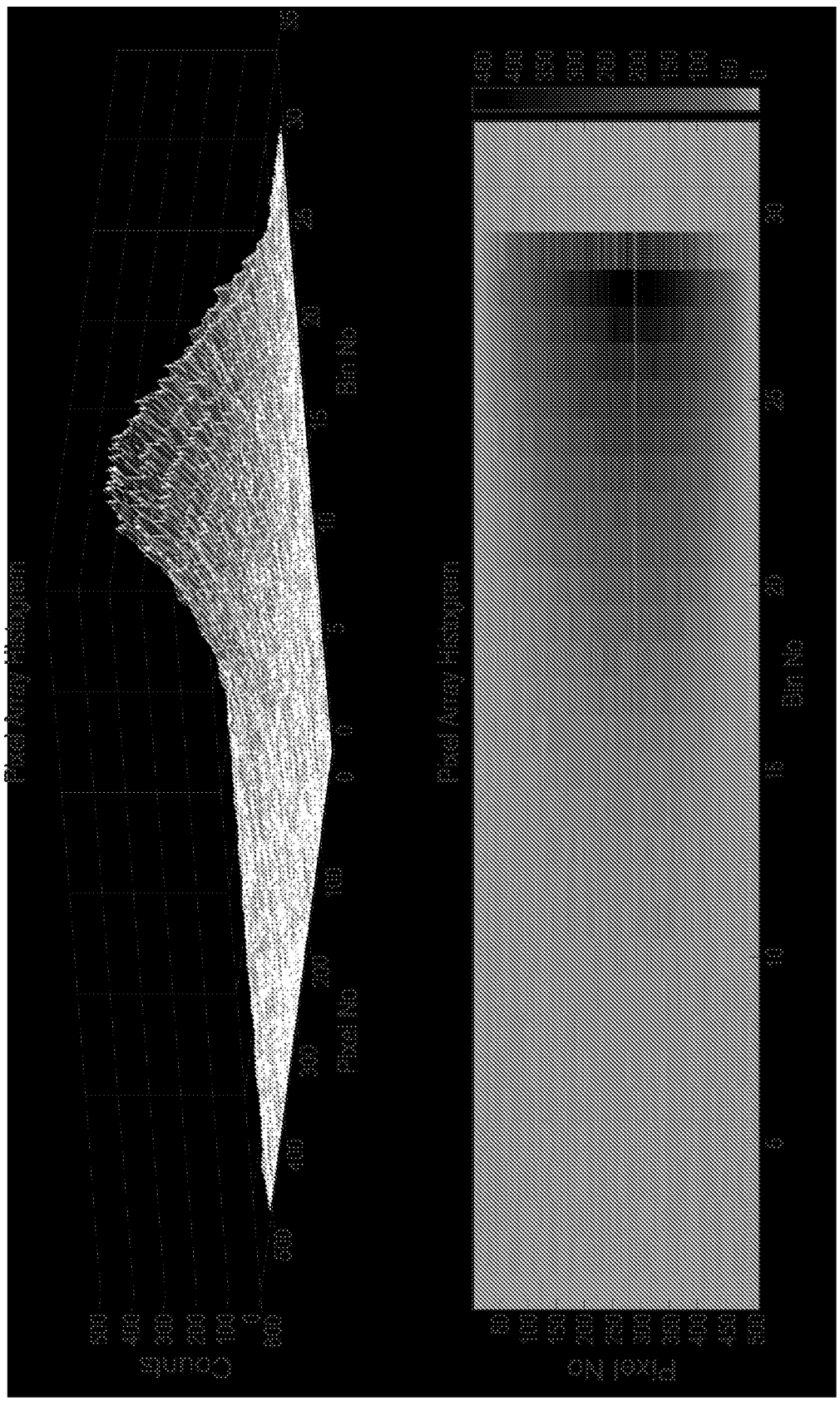
FIG. 9 shows example lifetime decays captured using the photon sensor.

FIG. 9 shows an example lifetime decay captured in on-chip per-pixel histogramming using the one dimensional sensor described with reference to FIG. 2. The upper plot is a 3 dimensional plot showing a pixel array histogram. The x and y axes display pixel number and bin number. The bin number runs from 0 to 31. The pixel number runs from 0 to 511. The z-axis displays photon counts. The plot therefore displays, for each pixel, photon counts for each time bin.

The lower plot shows a corresponding heat map. The x-axis displays bin number and the y-axis displays pixel number. The colour of each pixel-bin corresponds to the height shown in the upper plot which is the photon count.

It is a feature of certain embodiments that for each of the plurality of pixels, the per-pixel processing resource and/or memory of the pixels may be located adjacent to or at least partially beneath the plurality of photon detectors, for example formed beneath the SPADs in a layered structure. The pixels may be arranged in an array, and for at least some of the pixels the processing resource and/or the memory of the pixel device is located between the SPADs or other photon detectors of the pixel and the SPADs or other photon detectors of an adjacent pixel.

The sensor 10 of the embodiment of FIG. 2 may be provided on a single chip or circuit board, or on a plurality of chips or circuit boards, and the communications resources of the pixel devices may be configured to transmit detection data off the chip(s) or circuit board(s), for example to a further memory, processor or other processing resource that is external to the chip(s) or circuit board(s). For example, the detection data from each of the pixel devices may be transmitted to a PC or other computer, or to a server, or to dedicated processing and storage hardware for further processing and storage. The chip(s) or circuit board(s) may include a further communication resource, and the detection data from the communications resources of the pixel devices may be transmitted to the further memory and/or further processing resource via the further communications resource of the chip(s) or circuit board(s). The detection data may be received and re-transmitted by the further communications resource. The chip(s) and circuit board(s) in some embodiments may include an additional memory for storing detection or other data and/or an additional processing resource that may perform further processing of the detection data before transmission off-chip or off-circuit board. The additional processing resource may, for example, process the detection data to extract features of interest. The features of interest may comprise features of interest identified in the histogram data, for example a position or height of a peak, or one or more fitting parameters that may be used to fit a decay curve to the histogram data. By including the additional processing resource on chip, feature extraction or other processes may be performed more rapidly. However, the additional processing resource is not limited to being provided on the same chip or circuit board as the detectors and in some embodiments the additional processing resource may be provided off-chip or off-circuit board.

Figure 10:
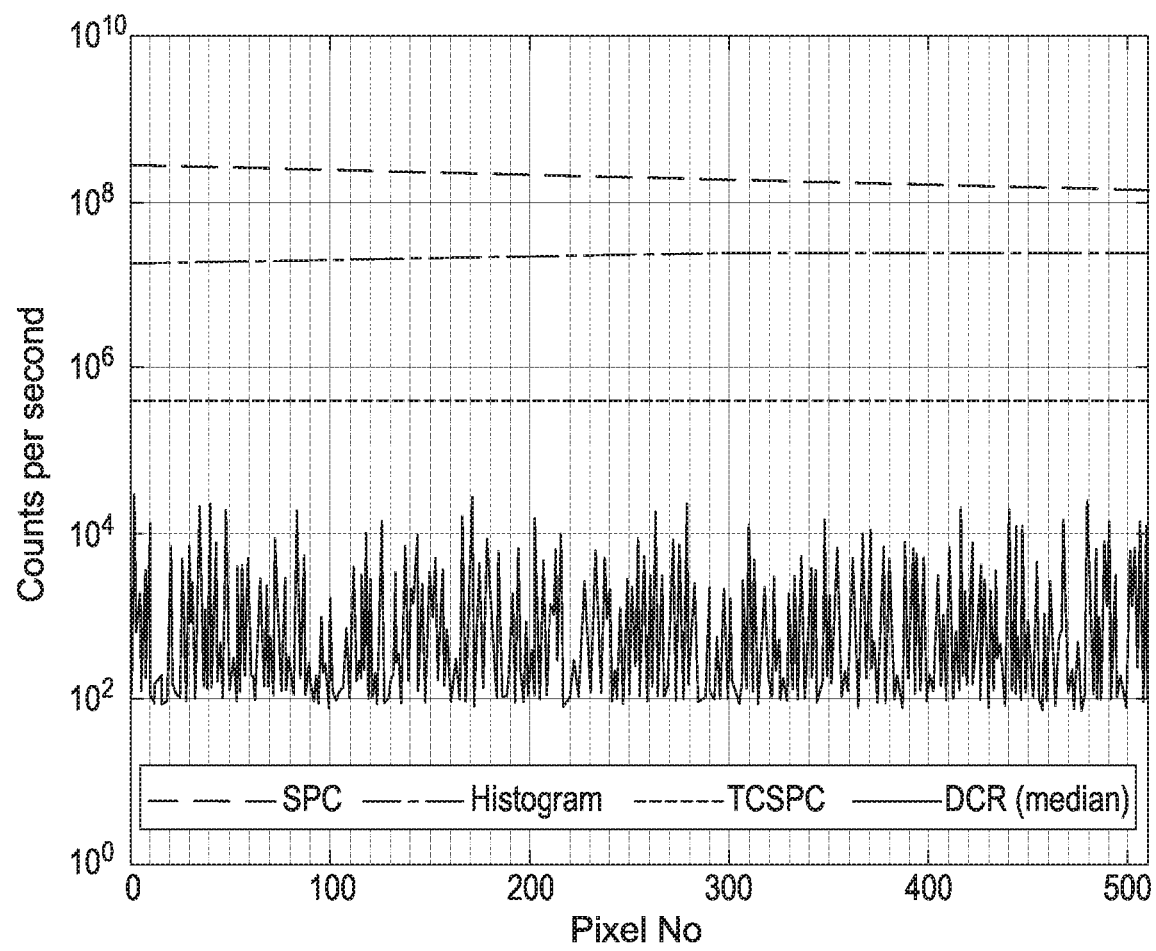
FIG. 10 shows maximal count rate comparisons captured using a line sensor.
Figure 11:
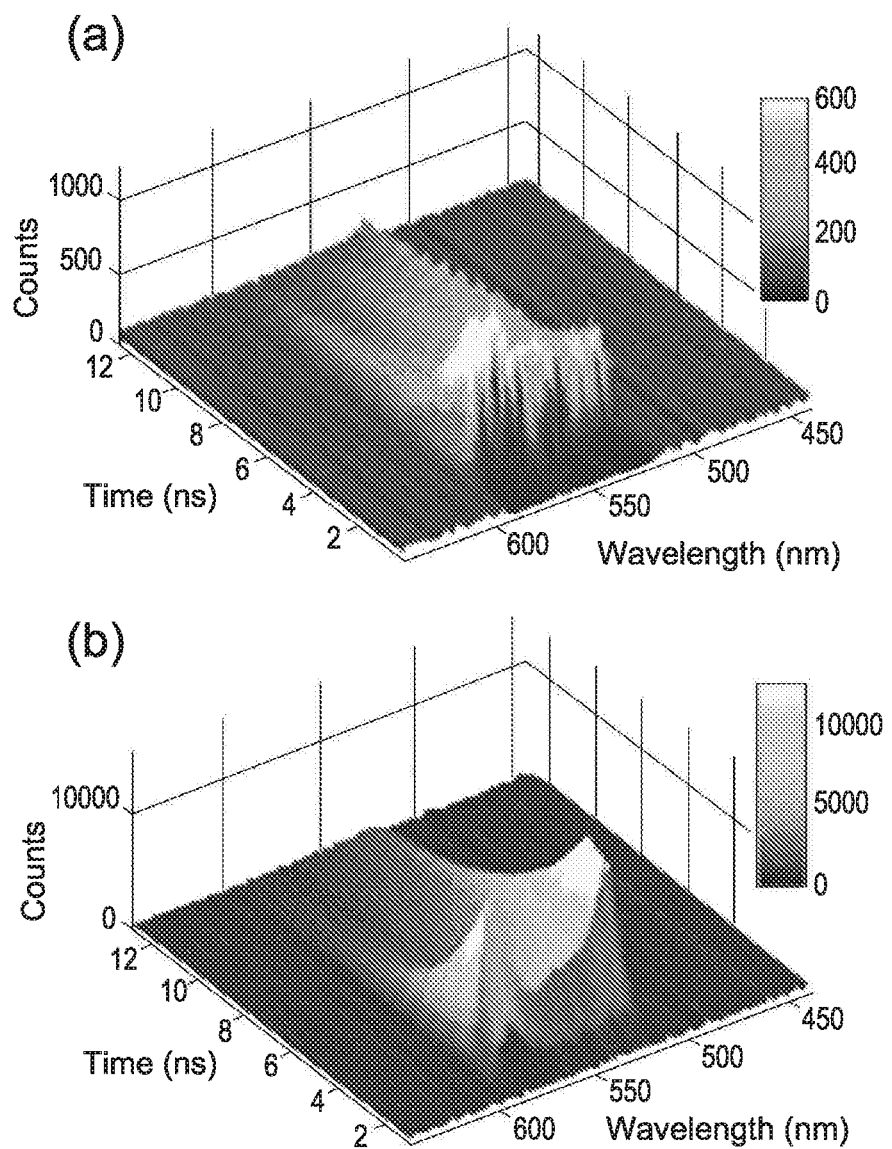
FIG. 11 shows time resolved 3-D spectra based on (a) TCSPC and (b) Histogram modes captured using a line sensor.
Figure 12:
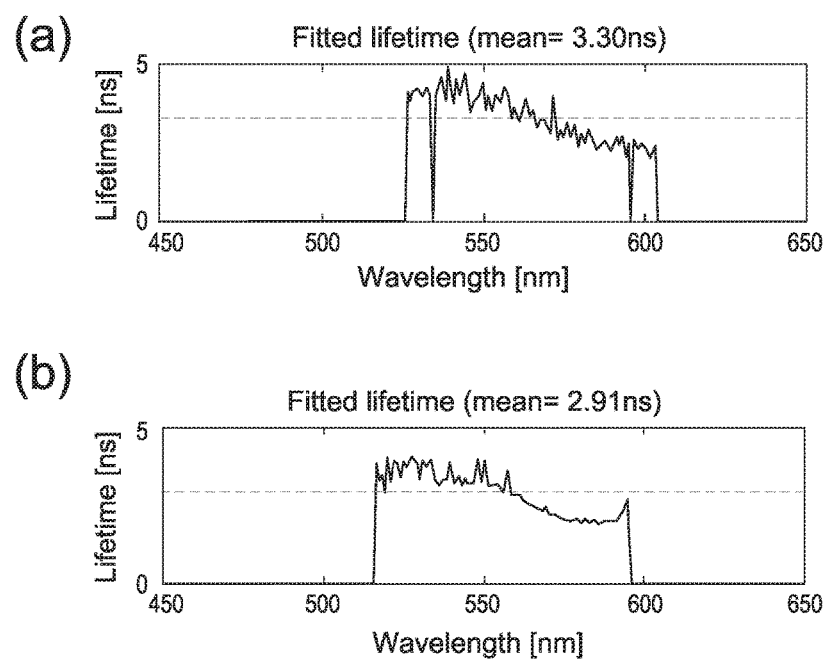
FIG. 12 shows estimated lifetimes based on (a) TCSPC and (b) Histogram modes captured using a line sensor.
Figure 13:
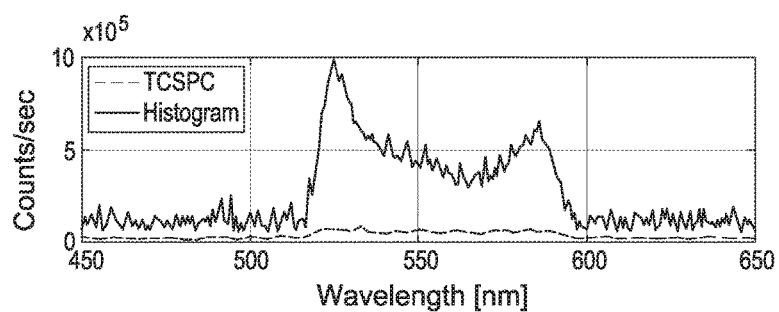
FIG. 13 shows count rate comparisons between TCSPC and Histogram modes captured using a line sensor.
Figure 14:
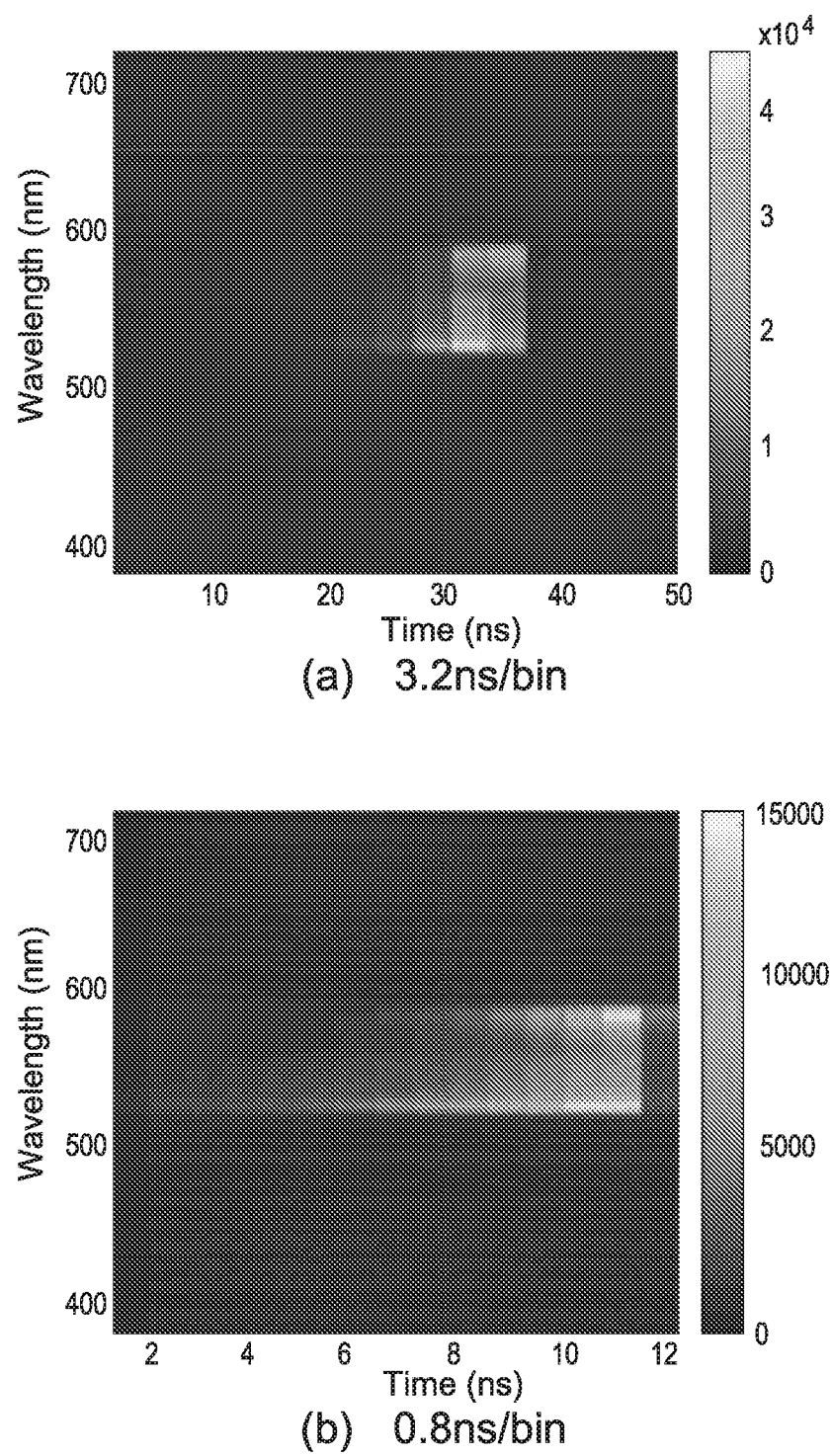
FIG. 14 illustrates a zooming feature of Histogram mode.

A line sensor according to embodiments was tested under controlled LED illumination triggered at 100 MHz to measure the maximum count rate in all modes. As shown in FIG. 10, per-pixel histogramming achieves ~¼ SPC count rate demonstrating the ability to maximise TCSPC event timing. Fluorescein-Rhodamine FRET was investigated in order to demonstrate the time-resolving spectral capabilities of the sensor. The line sensor was placed in a spectrograph and captured fluorescence from a sample illuminated by a 483 nm pulsed laser diode (20 MHz repetition rate). FIG. 11 shows a time-resolved spectrum of the mixture obtained in TCSPC mode (FIG. 11(a)) and the on chip histogramming mode (FIG. 11(b)). Two clear peaks are obtained at wavelengths of 527 nm and 584 nm, with two distinct lifetimes. The fluorescent lifetimes are as expected for the dyes involved (FIG. 12). FIG. 13 shows that the on-chip histogramming data acquisition rate per wavelength is up to 15 times greater than raw TCSPC mode. This increases to 68 times with a Fluorescein sample alone. Zooming from 3.2 ns/bin to 0.8 ns/bin is demonstrated in FIG. 14. The sensor empowers existing time-resolved spectroscopy and imaging applications and enables new ones.

In certain embodiments, the sensor may only consume power when a photon hits. Another advantage that may be provided by embodiments is that the sensor also reduces large data volume required to be output by SPAD based time-resolved image sensors. In addition, the sensor has a low power requirement scaling with number of photons incident sensor. A further advantage is that the sensor can be efficiently implemented in a stacked 3D CMOS with an advanced lower tier process.

A skilled person will appreciate that variations of the enclosed arrangement are possible without departing from the invention. For example, the per-pixel memory resource 50 may be part of a larger memory resource. For example, a memory resource may be provided for all pixels, but partitioned into independent pixel partitions for each pixel. In a further example, while time bins are shown as equal in width a varying time mode can be implemented to provide logarithmically sized time bins for the histogram, for example so that each time bin width has a size T, 2T, 4T, 8T etc. This can equalise photon counts in each bin for a response curve that is exponentially decreasing waveform as found in fluorescence lifetimes.

Further variants of the sensor may include to eliminate the need for a thermometer decoder and to reduce power by operating a TDC at a supply voltage which is a function of conversion time.

The sensor in certain embodiments has application wherever brief (for example, few 100 ns) bursts of light are generated and it is desired to capture accurately spatial position and time of arrival, as well as determining the number of photons in the event. One application is in the field of spectral fluorescence lifetime scanning for medical/scientific applications, e.g. endoscopy, cancer detection, ingestible pills. The invention is not limited to the above applications and may equally be used, for example, for time of flight distance sensing/imaging, 3D imaging, Lidar, Lidar for driverless cars (ADAS), people counting in buildings, 3D object scanning on production lines, seeing behind corners for defence, barcode scanning, ground digitisation in drones, 3D range imaging, object digitisation. The sensor may be used for any other suitable applications in further embodiments.

The processing resource and the further processing resource may be provided as dedicated circuitry, for example a dedicated arrangement of electronic components to provide the desired functionality, or may be provided as software, hardware or any appropriate combination of software and hardware.

The above description of specific embodiments is made by way of example only and not for the purposes of limitation. It will be clear to the skilled person that modifications of detail may be made within the scope of the invention.

The invention claimed is:

1. A sensor apparatus for photon sensing, comprising:
a plurality of pixel devices, each pixel device comprising:
  a plurality of photon detectors arranged to produce photon detection signals in response to photon detection events;
  a processing resource configured to process photon detection signals to produce photon detection event signals, wherein each photon detection event signal comprises time data representative of a photon detection time at which a respective photon detection event occurred;
  a pixel memory;
  a further processing resource configured to process the photon detection event signals to obtain detection data representative of photon detection events over a detection period; and
  a communication resource for transmitting the detection data from the pixel device,
wherein the processing of the photon detection event signals is such that at least one of storing or transmission of the detection data uses less at least one of storage capacity or communication capacity than would be used by at least one of storage or transmission of the photon detection event signals directly, wherein the processing of the photon detection event signals comprises assigning the photon detection event signals between a plurality of time bins, and wherein each time bin has a width representing a time interval and the further processing resource is configured to at least one of modify or select a part of the time data in order to select or vary the width of the time bins.

2. The sensor apparatus according to claim 1, wherein each photon detector comprises a single photon avalanche diode (SPAD).

3. The sensor apparatus according to claim 1, wherein the processing of the photon detection signals produced by the photon detectors comprises a time to digital conversion process.

4. The sensor apparatus according to claim 1, wherein at least one of the processing of the photon detection event signals comprises a histogramming process or the detection data comprises histogram data.

5. The sensor apparatus according to claim 1, wherein the further processing resource is configured to select the detection period in dependence on a measured or expected position of a peak in a distribution of photon detection events.

6. The sensor apparatus according to claim 1, wherein the photon detection event signals are obtained during the detection period and the processing of the photon detection event signals comprises selecting a portion of the detection period and excluding photon detection event signals from outside the selected portion of the detection period.

7. The sensor apparatus according to claim 1, wherein the detection data represents a distribution of photons detected at the sensor apparatus as a function of time.

8. The sensor apparatus according to claim 1, wherein the processing comprises obtaining count data representing a respective count value for each time bin of the plurality of time bins.

9. The apparatus as claimed in claim 1 further comprising a delay generator for modifying a clock signal provided to the processing resource, thereby at least one of to delay collection of photon detection data or to shift the detection period.

10. The sensor apparatus according to claim 1, wherein the further processing resource is configured to select or vary the width of at least one of the time bins automatically or in response to user input, and/or based on at least one configuration parameter.

11. The sensor apparatus according to claim 1, wherein the further processing resource is configured to assign the photon detection event signals for the detection period or the selected portion of the detection period across the series of time bins.

12. The sensor apparatus according to claim 1, wherein each item of time data comprises a series of bits and the modifying of the time data comprises, for at least some of the items of time data, excluding at least some bits of the series of bits.

13. The sensor apparatus according to claim 1, wherein each pixel device is configured to reset the further processing resource and write signals from the further processing resource automatically.

14. The sensor apparatus according to claim 1, wherein, for each of the pixel devices, the communication resource of the pixel device is configured to transmit the detection data from the pixel device to at least one of an additional processing resource remote from the pixel device or a further memory remote from the pixel device.

15. The sensor apparatus according to claim 14, wherein at least one of the additional processing resource or the further memory is configured to at least one of process or store detection data from each of the plurality of pixel devices.

16. The sensor apparatus according to claim 14, wherein the detection data comprises or is representative of time varying data and the additional processing resource is arranged to extract at least one feature of interest from the time varying data.

17. The sensor apparatus according to claim 14, wherein the sensor apparatus is provided on a chip or circuit board and at least one of the additional processing resource or further memory is outside the chip or circuit board.

18. The sensor apparatus according to claim 1 wherein, for each of the plurality of pixel devices, at least one of the further processing resource or the memory of the pixel device is located adjacent to or at least partially beneath the plurality of photon detectors.

19. The sensor apparatus according to claim 1, wherein the plurality of pixel devices are arranged in an array, and for at least some of the pixel devices at least one of the further processing resource or the memory of the pixel device is located between the photon detectors of the pixel device and the photon detectors of an adjacent pixel device.

20. The sensor apparatus according to claim 1, wherein for at least some of the pixel devices the processing resource comprises a shared processing resource or component that is shared by at least some of the plurality of pixel devices.

21. The sensor apparatus as claimed in claim 1, wherein the photon detection events occur in response to application of laser radiation to a subject, and the apparatus is configured such that operation of the photon sensors and/or the processing of the detection event signals and/or the detection period is synchronised with operation of a laser that is configured to apply the laser radiation.

22. The sensor apparatus as claimed in claim 1 configured for use in a Lidar system, a Time-of-flight system, a fluorescent spectroscopy system or a Raman spectroscopy system.

23. A sensing method, comprising:

obtaining photon detection event signals at a pixel device in response to photon detection events, wherein each photon detection event signal comprises time data representative of a detection time at which the photon detection event occurred;

processing at the pixel device the photon detection event signals to obtain detection data representative of photon detection events over a detection period; and transmitting the detection data from the pixel device, wherein the processing is such that at least one of the storing or the transmission of the detection data uses less at least one of storage capacity or communication capacity than would be used by at least one of storage or transmission of the photon detection event signals, wherein the processing of the photon detection event signals comprises assigning the photon detection event signals between a plurality of time bins, and wherein each time bin has a width representing a time interval and the further processing resource is configured to at least one of modify or select a part of the time data in order to select or vary the width of the time bins.

24. A sensing system comprising a laser configured to apply laser radiation to a subject, and a sensor apparatus that is configured to sense photons emitted by the subject in response to the laser radiation, wherein the sensor apparatus comprises:

a plurality of pixel devices, each pixel device comprising:

a plurality of photon detectors arranged to produce photon detection signals in response to photon detection events;

a processing resource configured to process photon detection signals to produce photon detection event signals, wherein each photon detection event signal comprises time data representative of a photon detection time at which a respective photon detection event occurred;

a pixel memory;

a further processing resource configured to process the photon detection event signals to obtain detection data representative of photon detection events over a detection period; and a communication resource for transmitting the detection data from the pixel device, wherein the processing of the photon detection event signals is such that at least one of storing or transmission of the detection data uses less at least one of storage capacity or communication capacity than would be used by at least one of storage or transmission of the photon detection event signals directly, wherein the processing of the photon detection event signals comprises assigning the photon detection event signals between a plurality of time bins, and wherein each time bin has a width representing a time interval and the further processing resource is configured to at least one of modify or select a part of the time data in order to select or vary the width of the time bins.

* * * * *